(12) United States Patent  
Kimura

(10) Patent No.: US 7,359,103 B2  
(45) Date of Patent: Apr. 15, 2008

(54) TRANSMISSION TYPE SPATIAL LIGHT MODULATOR AND TRANSMISSION TYPE SPATIAL LIGHT MODULATION ARRAY DEVICE

(75) Inventor: Koichi Kimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 266 days.

(21) Appl. No.: 11/145,926

(22) Filed: Jun. 7, 2005

(65) Prior Publication Data

US 2005/0286106 A1 Dec. 29, 2005

(30) Foreign Application Priority Data

Jun. 7, 2004 (JP) .......................... P.2004-168097

(51) Int. Cl.  
*G02B 26/00* (2006.01)  
*G02B 26/08* (2006.01)

(52) U.S. Cl. .................. 359/237; 359/247; 359/298; 359/302

(58) Field of Classification Search ................ 359/237  
See application file for complete search history.

(56) References Cited

U.S. PATENT DOCUMENTS 5,592,447 A * 1/1997 Takishima ............... 369/44.27

6,829,079 B2 * 12/2004 Oda et al. .................... 359/318  
6,919,982 B2 * 7/2005 Nimura et al. ............... 359/254  
7,113,321 B2 * 9/2006 Nanjyo et al. ............... 359/290

FOREIGN PATENT DOCUMENTS

| JP | 8-5942 A | 1/1996 |
|---|---|---|
| JP | 11-149050 A | 6/1999 |
| JP | 11-249037 A | 9/1999 |
| JP | 2000-180742 A | 6/2000 |
| JP | 2001-201716 A | 7/2001 |
| JP | 2002-23072 A | 1/2002 |

* cited by examiner

*Primary Examiner*—Ricky Mack  
*Assistant Examiner*—Jessica T Stultz  
(74) *Attorney, Agent, or Firm*—Sughrue Mion, PLLC

(57) ABSTRACT

A transmission type spatial light modulator is equipped with a minute transparent optical member for deflecting light in a direction different from an incident direction of incident light and emitting the light, a support member for supporting the minute transparent optical member at a midair position so that the light emission face can be inclined with respect to a plane perpendicular to a travel direction of incident light L1, and a driving member for obliquely displacing the minute transparent optical member by an electrical mechanical operation to vary the emission direction of light from the minute transparent optical member.

30 Claims, 23 Drawing Sheets

(INITIAL STATE: TOTAL REFLECTION)

(INITIAL STATE: TRANSMISSION)

FIG. 27
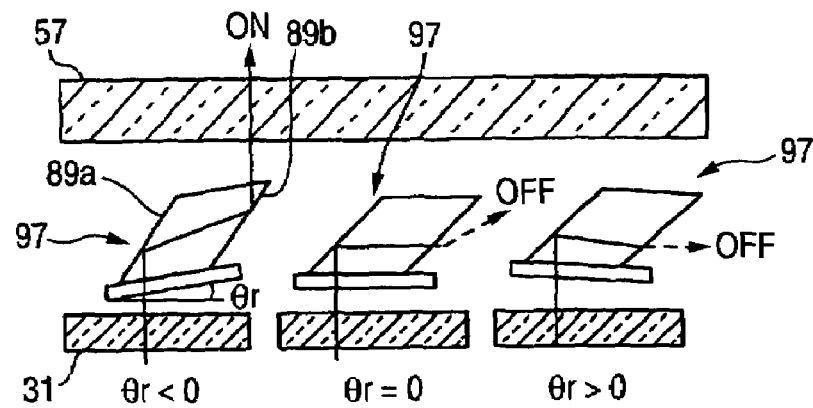
FIG. 28A       FIG. 28B       FIG. 28C
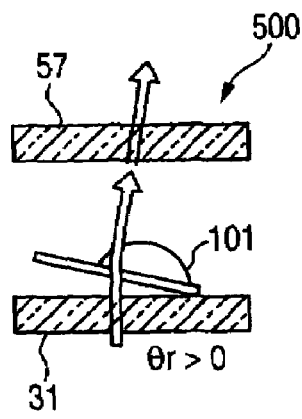 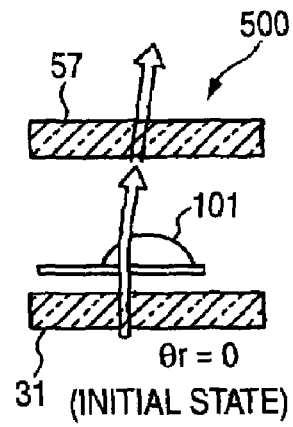 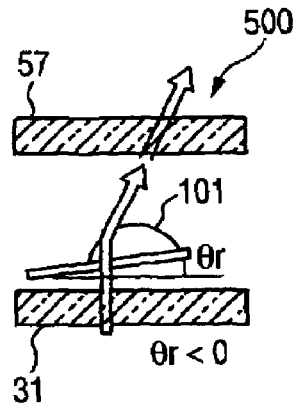
FIG. 29A       FIG. 29B       FIG. 29C
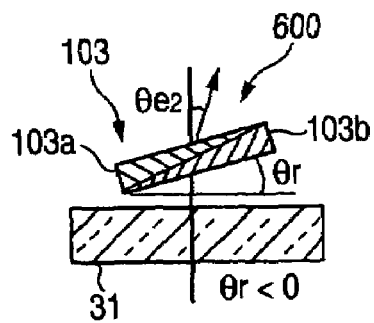 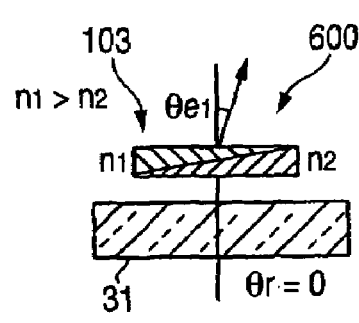 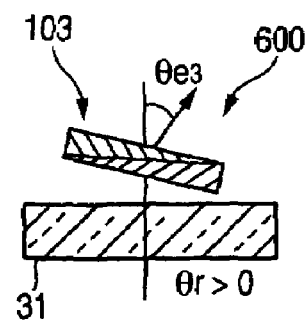

TRANSMISSION TYPE SPATIAL LIGHT MODULATOR AND TRANSMISSION TYPE SPATIAL LIGHT MODULATION ARRAY DEVICE

This application is based on Japanese Patent application JP 2004-168097, filed Jun. 7, 2004, the entire content of which is hereby incorporated by reference. This claim for priority benefit is being filed concurrently with the filing of this application.

BACKGROUND OF THE INVENTION

1. Technical Field of the Invention

The present invention relates to a transmission type spatial light modulator and a transmission type spatial light modulation array device.

2. Description of the Related Art

A light deflector is known as a device for controlling any one of an angle or position of a light propagation direction or both the angle and the position with respect to the time. As the light deflector are known a reflection type mechanical type light deflector for deflecting light by swinging a reflection mirror, and a transmission type mechanical type light deflector for deflecting light by rotating a prism or the like. In the reflection type, incident light and emission light exist at the same side with respect to the device. On the other hand, in the transmission type, the incident light and the emission light exist at the different sides with respect to the device, and thus it has an advantage that the construction of the peripheral optical system is simple. For example, in the construction disclosed in JP-A-11-249037, PBS (Polarized beam splitter) is disposed to make light from a light source incident to a reflection type spatial light modulation array device. However, it is not needed in the transmission type. In the construction disclosed in JP-A-2001-201716, surface reflection light from a reflection type spatial light modulation array device (micro-mirror device) is unnecessary light, and it reduces the contrast, so that a light separating prism provided to prevention the reduction of the contrast enlarges the device.

In the reflection type, since the incident light and the emission light (deflected light) and the unnecessary light such as the surface reflection light based on the incident light exist at the same side with respect to the device, it is difficult to freely set the directions of ON light (effective light) and OFF light (unnecessary light) in the emission light (deflected light). For example, when great importance is placed on the contrast, it is required that the directions of the ON light and the unnecessary light such as the surface reflection light, etc. are different from each other. On the other hand, in the transmission type, the unnecessary light such as the surface reflection light, etc. based on the incident light exists at the incident side, and only the emission light (deflected light) exists at the emission side, so that it is possible to freely set the directions of the ON light and the OFF light in the emission light. Therefore, the degree of freedom of the design of a peripheral optical system is enhanced, and the latitude of the optical precision is relatively enhanced. An example of a conventional transmission type mechanical light deflector will be described. In this specification, "deflection" means the function of controlling any one of the angle and position of the light propagation direction or both the angle and the position with respect to the time.

An optical switch disclosed in JP-A-2002-23072 is equipped with a plurality of light input/output portions 1 comprising optical fibers for transmitting optical signals, deflecting means (wedged prism) 3 for deflecting a light beam corresponding to an optical signal incident from the light input/output portion 1 and selecting an optical fiber of the light input/output portion 1 to which the optical signal should be transmitted, and light converging means 5a, 5b for converging the light beam corresponding to the optical signal incident/emitted to/from the optical input/output portion 1 to set the optical beam to a collimated beam, and converging the light beam emitted from the deflecting means 3 into the optical fiber of the light input/output portion 1 selected by the deflecting means 3 as shown in FIG. 36.

According to the optical switch, since a light beam is deflected and an optical fiber to which the light should be made incident is selected by rotating the wedge-shaped prism 3, there can be achieved effects that the optical fiber itself is not required to be moved, and thus the optical fiber can be prevented from being damaged by the movement of the optical fiber, so that the reliability of light transmission can be enhanced.

As shown in FIGS. 37A to 37B, a beam deflecting device disclosed in JP-A-2000-180742 is equipped with a rotating prism body 7 that is formed of an optical material and has two or more pairs of a light incident face and a light emission face which are arranged in parallel so as to face each other, and a rotationally driving device for rotating the light incident faces 7a to 7c and the light emission faces 7d to 7f around the rotational axial line, and by rotating the rotational prism body 7 around the rotational axial line R, a light beam which is incident along the optical axis O directing to the rotational axial line to the light incident faces 7a to 7c within a plane which is vertical to the light incident faces 7a to 7c, the light emission faces 7d to 7f and the rotational axial line R is emitted from the confronting light emission faces 7d to 7f as a light beam parallel to the optical axis O, the distance of the light beam from the optical axis varying with respect to the time.

According to the beam deflecting device, the rotational prism body 7 having two or more pairs of optical faces which are arranged in parallel so as to face each other is used, and a light beam parallel to the optical axis O, the distance thereof from the optical axis varying with respect to the time is emitted, so that a long scan width can be achieved without increasing the weight of the rotational prism body 7.

In an apex-angle variable prism device disclosed in JP-A-8-5942, the peripheries of two confronting glass plates 9, 11 are covered by a bellows 13, and transparent liquid 14 such as silicon oil or the like is closely sealed therein. The two confronting glass plates 9, 11 are relatively inclined and the apex angle between the two glass plates 9, 11 is made variable as shown in FIGS. 38A and 38B. In FIG. 38A, the two glass plates 9 and 11 are kept in parallel, and in this case, the incident angle and the emission angle of a light beam 15 to/from the apex-angle variable prism are equal to each other. On the other hand, when they intersects to each other at an angle as shown in FIG. 38B, the light beam is bent at some degree as indicated by the light beam 15.

According to the apex-angle variable prism device, when a camera is inclined due to shaking or the like, the angle (apex angle) of the apex-angle variable prism provided in front of a photographing lens is controlled so that the light beam 15 corresponding to the inclination angle is bent, thereby removing blurring.

As shown in FIG. 39, a light deflecting device disclosed in JP-A-11-149050 has a semi-spherical body 17 comprising a plane portion for refracting/deflecting an incident light beam and a semi-spherical portion facing the plane portion so that the plane portion is wrapped by the semi-spherical portion, a support member 19 for supporting the semi-spherical body 17 so that the semi-spherical body 17 is freely rotatable and driving members 21, 23 for rotating the semi-spherical body 17. The semi-spherical body 17 has a solid body, and is formed of a material through which a light beam to be deflected is transmissible. In addition, the plane portion and a space or medium 25 which comes into contact with the plane portion are different in refractive index.

According to this light deflecting device, the light deflection is carried out mechanically, and thus it is possible to set a large deflection angle θ in a three-dimensional free direction. Furthermore, arrangements at the incident side and emission side can be achieved along the transmission direction, and thus the whole device can be miniaturized.

However, the optical switch disclosed in JP-A-2002-23072, the beam deflecting device disclosed in JP-A-2000-180742 and the apex-angle variable prism device disclosed in JP-A-8-5942 are unsuitable structurally or as a driving-mechanism for the construction of the minute transmission type spatial light modulator for carrying out light deflection on a pixel basis in an exposure head, a display or the like, and it is difficult to carry out a low-voltage driving operation by any disclosed driving members even if miniaturization thereof is possible. On the other hand, the light deflecting device disclosed in JP-A-11-149050 is applicable as a minute transmission type spatial light modulator. However, since the support portion thereof is filled with lubricant, it is estimated that the response is lowered by the friction thereof. Furthermore, it has low resistance to shock and temperature variation, and thus there is a risk that it has low reliability and a short lifetime. Under such a condition, it is necessarily and unavoidably difficult to apply this light deflecting device to an exposure head, a display or the like which needs high-speed response deflection of μs-order and a semi-permanent operation. Furthermore, an extremely high precision manufacturing technique is required to form a high-precision semi-spherical structure which is directly associated with the stable performance of the rotational operation of the semi-spherical body and the recess structure of the surrounding portion which is matched with the structure of the semi-spherical body. Therefore, when it is applied to an exposure head, a display or the like, it is estimated that it is realistically difficult in yield to manufacture a transmission type spatial light modulation array device in which transmission type spatial light modulators each having a large number of pixels are arranged. The present invention has been implemented in view of the foregoing situation.

SUMMARY OF THE INVENTION

An object of the invention is to provide a transmission type spatial light modulator and a transmission type spatial light modulation array device that can perform high-speed deflection and a low-voltage driving operation, further miniaturize elements and enhance the contrast by suppressing stray light or unnecessary light. The object can be attained by adoption of the following constitution.

(1). A transmission type spatial light modulator comprising: a minute transparent optical member for deflecting and emitting light in a direction different from the incident direction of incident light; a support member for supporting the minute transparent optical member in a midair position so that a light emission face thereof can be inclined with respect to a plane perpendicular to a travel direction of the light incident direction; and a driving member for obliquely displacing the minute transparent optical member by an electrical mechanical operation to vary the light emission direction from the minute transparent optical member.

In the transmission type modulator, the direction and light amount of transmission light can be controlled by a small displacement amount. Furthermore, emission light is directed in the same travel direction as incident light, and an optical system which is needed in the case of a reflection type modulator is not required. In addition, the separation between ON light and OFF light can be more easily performed as compared with the reflection type modulator. Furthermore, the wavelength-dependence is lowered as compared with an interference type spatial light modulator using the Fabry-Perot effect or the like.

(2). The transmission type spatial light modulator according to (1), further comprising a light shielding member that is disposed ahead of the light emission face of the minute transparent optical member and shields any emission light in a direction-variable range of light emitted from the minute transparent optical member.

In the transmission type spatial light modulator, a desired area in the direction variable range of light emitted from the minute transparent optical member can be set to a light transmission area or a light shielding area.

(3). The transmission type spatial light modulator according to (2), wherein the driving member obliquely displaces the minute transparent optical member to displace the emission light with respect to the light shielding member, thereby varying the transmission light amount of the emission light.

In this transmission type spatial light modulator, ON/OFF of light intensity and a switching operation of a route can be performed in cooperation with a light deflecting operation based on the oblique displacement of the minute transparent optical member.

(4). The transmission type spatial light modulator according to anyone of (1) to (3), wherein the minute transparent optical member has a refractive index larger than 1 and light incident and emission faces are formed by non-parallel faces.

In this transmission type spatial light modulator, the minute transparent optical member can be formed of a structure having a single refractive index. The emission angle of the deflected light can be freely set by merely controlling the design of the inclination angles of the light incident and emission faces.

(5). The transmission type spatial light modulator according to any one of (1) to (4), wherein the minute transparent optical member has a refractive index distribution different in refractive index in accordance with the light travel direction, and a light deflection direction based on the refractive index distribution is different from the light travel direction.

In this transmission type spatial light modulator, the deflection range can be arbitrarily set by using a flat-plate type minute transparent optical member. Furthermore, the thickness of the minute transparent optical member can be reduced.

(6). The transmission type spatial light modulator according to any one of (1) to (4), wherein the minute transparent optical member has a total reflection face for totally reflecting the incident light.

In this transmission type spatial light modulator, the total reflection of the incident light is possible in addition to the deflection of the incident light. Accordingly, the deflected light is emitted from the opposite side to the light incident face of the minute transparent optical member, and the reflected light is emitted from the light incident face side of the minute transparent optical member, so that the effective light (ON light) and the unnecessary light (OFF light) are separated to the opposite sides with respect to the minute transparent optical member.

(7). The transmission type spatial light modulator according to (6), wherein the minute transparent optical member is obliquely displaced by the driving member to transmit or totally reflect the incident light.

In this transmission type spatial light modulator, the minute transparent optical member is obliquely displaced so that the incident angle of the incident light incident to the total reflection surface is smaller or larger than the critical angle, whereby the ON light and the OFF light are separated to the opposite sides with respect to the minute transparent optical member. Furthermore, since the total reflection is carried out by the total reflection surface formed in the minute transparent optical member, so that internal total reflection (Total Internal Reflection) can be performed and thus light absorption can be reduced as compared with the reflection on the total reflection surface.

(8). The transmission type spatial light modulator according to (7), further comprising an optical path correcting member that is disposed ahead of the light emission face of the minute transparent optical member to make an incident angle and an emission angle substantially coincident with each other.

In this transmission type spatial light modulator, the emission light (ON light) which is separated to the opposite side to the incident light with respect to the minute transparent optical member can straightly travel in the same direction as the incident light.

(9). The transmission type spatial light modulator according to any one of (6) to (8), wherein the minute transparent optical member is designed in a prism-shape.

In this transmission type spatial light modulator, a large deflection angle can be achieved by a small inclination angle. Furthermore, the reflection loss can be reduced, and the light absorption can be reduced as compared with the reflection on the metal surface. Still furthermore, since the deflection angle is large, it is easy to take a margin, and the degree of freedom of an optical design of an optical path or the like can be enhanced.

(10). The transmission type spatial light modulator according to (6) to (8), wherein at least a part of the light incident face or light emission face of the minute transparent optical member is designed in a curved-surface shape.

In this transmission type spatial light modulator, the refractive index is continuously varied, and the refractive index difference in the refractive index variation range is set to a large value.

(11). The transmission type spatial light modulator according to (1), further comprising: a first prism member for receiving the emission light when the minute transparent optical member is obliquely displaced by the driving member and the emission light is emitted from the minute transparent optical member in a predetermined direction, and emitting the emission light as effective light while deflecting the emission light in a first direction; and a second prism member for receiving the emission light when the minute transparent optical member is obliquely displaced by the driving member and the emission light is emitted from the minute transparent optical member in a direction different from the predetermined direction, and deflecting the emission light as unnecessary light in a second direction different from the first direction.

In this transmission type spatial light modulator, the emission directions of the effective light and the unnecessary light can be made greatly different by the first prism member and the second prism member, and for example, they can be made to the opposite directions.

(12). The transmission type spatial light modulator according to any one of (1) to (11), wherein the driving member obliquely displaces the minute transparent optical member by electrostatic force.

In this transmission type spatial light modulator, the minute transparent optical member can be electrically and mechanically operated at a high speed and with a low voltage to be obliquely displaced by electrostatic suction force caused by electrostatically-induced charges.

(13). A transmission type spatial light modulation array device comprising transmission type spatial light modulators according to anyone of (1) to (12), the transmission type spatial light modulators being arranged one-dimensionally or two-dimensionally.

In this transmission type spatial light modulation array device, the transmission type spatial light modulators having the same structure are arranged one-dimensionally or two-dimensionally, and function as one light modulation device. Therefore, high-density pixels can be subjected to light modulation at high speed in an application to an exposure head, a display or the like. Furthermore, the many transmission type spatial light modulators can be arranged with the same quality and high precision by a semiconductor manufacturing process.

(14). The transmission type spatial light modulation array device according to (13), wherein a micro-lens array having a plurality of micro-lenses disposed in connection with the respective transmission type spatial light modulators is disposed so as to confront the light incident face.

In this transmission type optical array device, incident light flux is converged, so that the minute transparent optical member can be miniaturized and reduced in weight. Furthermore, as compared with a case where no micro-lens is used, a minute transparent optical member having a small area can be formed, and thus a driving circuit area can be secured in the comparison of the same substrate area.

According to the transmission type spatial light modulator of the present invention, the minute transparent optical member for emitting light therefrom in a direction different from incident light is supported by the support member so as to be inclined, and the minute transparent optical member is obliquely displaced by the electrical mechanical operation of the driving member to vary the light emission direction. Therefore, the direction of the transmitted light and the light amount of the transmitted light can be controlled by a small displacement amount, and the high-speed deflection and the low-voltage driving operation can be implemented. Accordingly, a low power consumption driving operation can be performed. Furthermore, in the case of the reflection type spatial light modulator, the light incident path and the light reflection path to the modulator exist at the same surface side, and thus an optical system for avoiding the interference between both the optical paths is needed. However, according to the transmission type spatial light modulator of the present invention, the light emission light is directed in the travel direction of the incident light, so that the optical system needed in the case of the reflection type modulator is unnecessary. Accordingly, in the transmission type spatial light modulator of this invention, the construction of the peripheral optical system can be simplified, and thus the spatial light modulator can be miniaturized. Furthermore, the separation between the ON light and the OFF light can be more easily performed as compared with the reflection type spatial light modulator, and thus stray light and unnecessary light can be suppressed a and the contrast can be enhanced. Still furthermore, the wavelength-dependence which is observed in an interference type spatial light modulator using Fabry-Perot effect or the like can be eliminated.

According to the transmission type spatial light modulation array device of the present invention, the transmission type spatial light modulators are one-dimensionally or two-dimensionally arranged. Therefore, the transmission type spatial light modulators having the same structure are one-dimensionally or two-dimensionally arranged on the same substrate, and thus they function as one light modulation device, so that high-density pixels can be subjected to light modulation at high speed in an application to an exposure head, a display or the like. Furthermore, many transmission type spatial light modulators can be arranged with the same quality and with high precision by the semiconductor manufacturing process, so that the light emission light can be aligned and image display, etc. can be performed with high quality and high resolution.

BRIEF DESCRIPTION OF THE DRAWINGS

FIG. 27 is a cross-sectional view showing a modification 2 of the fifth embodiment which uses a parallelogram prism.

FIGS. 28A to 28C are cross-sectional views showing a sixth embodiment in which the light emission face of the minute transparent optical member is designed in a curved-surface shape.

FIGS. 29A to 29C are cross-sectional views showing a seventh embodiment in which the minute transparent optical member has a refractive index distribution.

Figure 1:
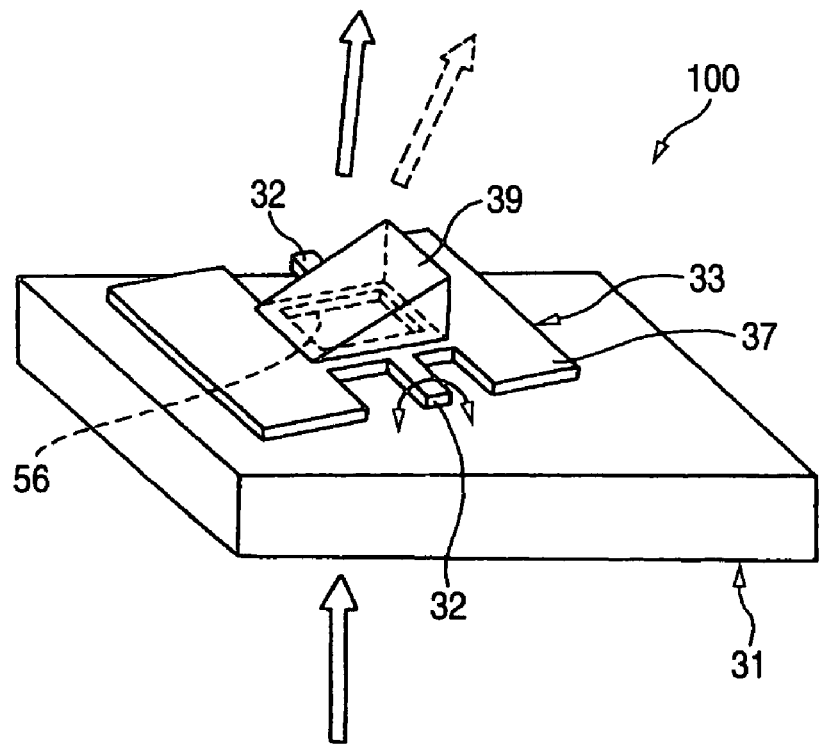
FIG. 1 is a perspective view showing a first embodiment of a transmission type spatial light modulator according to the present invention.

Reference numerals are used to identify various elements in the drawings including the following:
32 hinge (support member)
33, 85, 99, 103 minute transparent optical member
35 driving member
71 flexible flat plate (support member)
77 swing shaft (support member)
83 light shielding member
89 emission face (total reflection face)
91, 141 optical path correcting member
100, 180, 200, 300, 400, 500, 600 transmission type spatial light modulator
117 micro-lens array
117a micro-lens
700, 900 transmission type spatial light modulation array device
L1 incident light
L2 emission light

DETAILED DESCRIPTION OF THE INVENTION

Preferable embodiments of a transmission type spatial light modulator and a transmission type spatial light modulation array device according to the present invention will be described in detail with reference to the drawings.

Figure 2A:
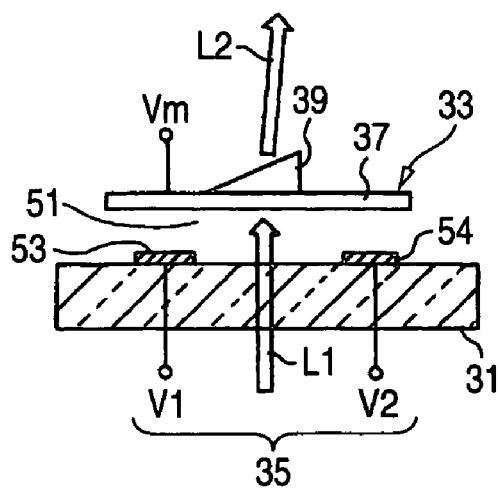
FIGS. 2A and 2B are cross-sectional views showing (FIG. 2A) an initial state and (FIG. 2B) an operation state of the transmission type spatial light modulator shown in FIG. 1.
Figure 2B:
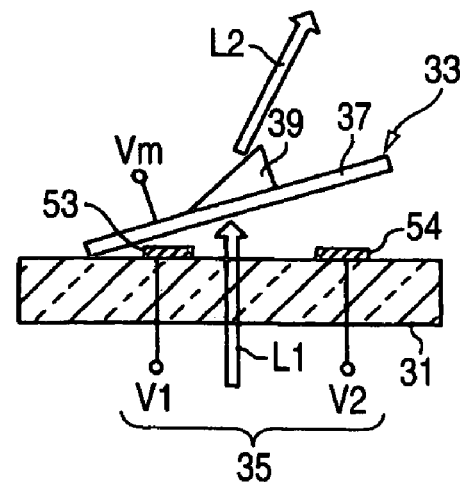

FIG. 1 is a perspective view showing a first embodiment of the transmission type spatial light modulator according to the present invention, and FIGS. 2A to 2B are cross-sectional showing an initial state (FIG. 2A) and an operation state (FIG. 2B) of the transmission type spatial light modulator shown in FIG. 1.

A transmission type spatial light modulator 100 according to an embodiment has a substrate 31, a minute transparent optical member 33 mounted on the substrate 31, a hinge (support member) 32 for supporting the minute transparent optical member 33 at both the side portions thereof, and a driving member 35 for obliquely displacing the minute transparent optical member 33 as basic constituent elements as shown in FIG. 1 and FIGS. 2A and 2B.

The minute transparent optical member 33 works to deflect light in a direction different from an incident direction of incident light L1. The minute transparent optical member 33 comprises movable film 37 having an electrically conductive portion described later formed at at least a part thereof, and a deflecting portion 39 provided on the upper surface of the thin film portion 37. The deflecting portion 39 may be a minute prism formed of glass, for example. The movable film 37 and the deflecting portion 39 may be formed separately from each other or integrally with each other.

The hinge 32 supports the minute transparent optical member 33 so that the movable film 37 is spaced from the substrate 31 through a gap 51 in parallel to the substrate 31 as shown in FIG. 2A, and also supports the minute transparent optical member 33 at a midair position so that the light emission face (the upper surface of the deflecting portion 39) is further inclined with respect to a plane perpendicular to the travel direction of incident light (that is, the surface of the substrate 31) as shown in FIG. 2B when force is applied in a distortion direction by a driving member 35.

The transmission type spatial light modulator 100 is designed, for example, so that the pixel area is set to 20 μm×20 μm in size, the movable film 37 is set to 10 μm×5 μm in size and the height of the short side of the deflecting portion 39 is set to about 3 to 4 μn.

The driving member 35 obliquely displaces the minute transparent optical member 33 by an electrical mechanical operation to greatly vary the emission direction of light from the minute transparent optical member 33 as shown in FIG. 2B. The driving member 35 has an electrically conductive portion provided to the movable film 37 (a voltage Vm is applied to the electrically conductive portion, and even in the construction that the electrically conductive portion is added to the movable film 37, the movable film 37 itself may be formed of electrically conductive film), and lower electrodes 53, 54 which are disposed at the substrate 31 side and confront the movable film 37 through the above gap 51. The lower electrodes 53, 54 are arranged at both the sides between which the hinge 32 is sandwiched, and voltages V1 and V2 are applied to the lower electrodes 53, 54, respectively.

Any material such as a glass substrate or the like may be used as the substrate 31 in so far as it is transparent to incident light. Even when it is an opaque substrate such as a Si substrate or the like, it is usable by providing a light transmissible property to only an area where incident light is deflected. Specifically, it is preferable that circuits (normally, a CMOS circuit and a wiring circuit therefor) for driving a device is formed on the Si substrate, the upper surface thereof is flattened by an insulating layer and an opening hole is formed at the area where the light deflection is carried out. The movable film 37 and the lower electrodes 53, 54 are provided on the upper surface of the flattened insulating layer, and these are electrically connected to one another through contact holes (not shown) provided in the insulating layer. These structures will be described in detail later.

Figure 3A:
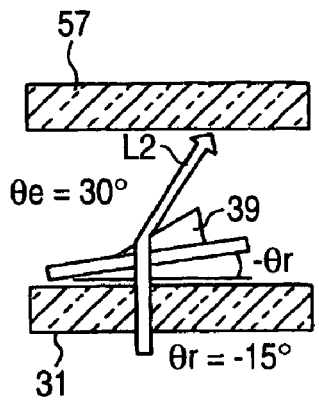
FIGS. 3A to 3C are diagrams showing the relationship between the inclination angle and the emission angle of the transmission type spatial light modulator shown in FIG. 1.
Figure 3B:
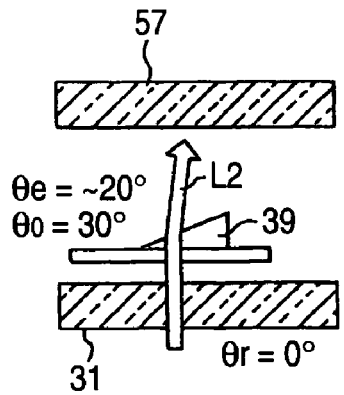
Figure 3C:
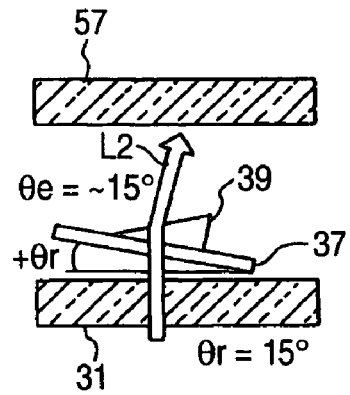

FIGS. 3A to 3B are diagrams showing the relationship between the inclination angle and the emission angle of the transmission type spatial light modulator shown in FIG. 1. In the transmission type spatial light modulator 100, for example when the prism angle (the intersecting angle between the incident face and the emission face) θo of a triangular deflecting portion 39 having a refractive index n=1.5 is equal to 30°, the inclination angle θr=0° and the emission angle θe of the deflected light is slightly less than 20° under an initial state where the driving member 35 is not actuated as shown in FIG. 3B. Furthermore, as shown in FIG. 3A, when the driving member 35 is actuated and the inclination angle θr=−15°, the incident angle of the incident light to the emission face is increased, and thus the emission angle θe of the deflected light emitted from the emission face is greatly varied to 30°. In this specification, the clockwise rotation is set as a positive-direction rotation, and the counterclockwise rotation is set as a negative-direction rotation and thus it is added with a minus sign. Furthermore, as shown in FIG. 3C, even when the driving member 35 is actuated and the inclination angle θr=15°, the emission angle θe of the deflected light is equal to slightly less than 15°, and the emission angle θe is not so different angle from that under the state of FIG. 3A. In the figures, 57 represents a transparent front-surface protection substrate disposed at the opposite side to the substrate 31 through the minute transparent optical member 33 so as to confront the substrate 31.

Figure 4A:
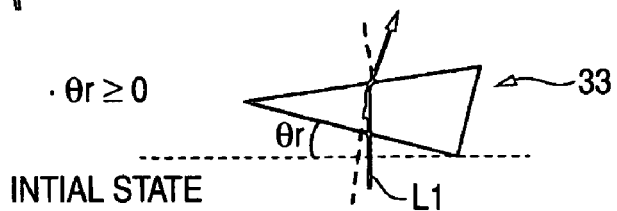
FIGS. 4A to 4D are diagrams showing the principle of emission angle control based on the oblique displacement of the transmission type spatial light modulator shown in FIG. 1.
Figure 4B:
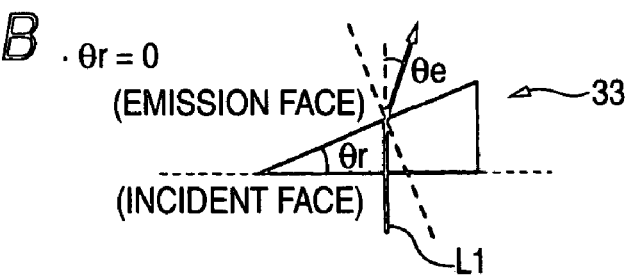
Figure 4C:
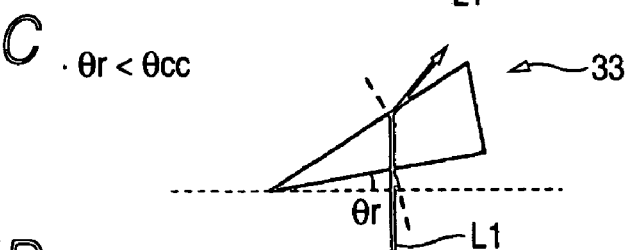
Figure 4D:
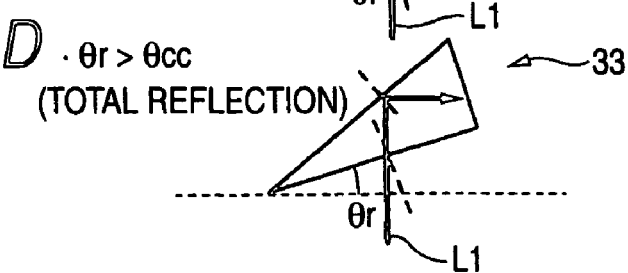
Figure 5:
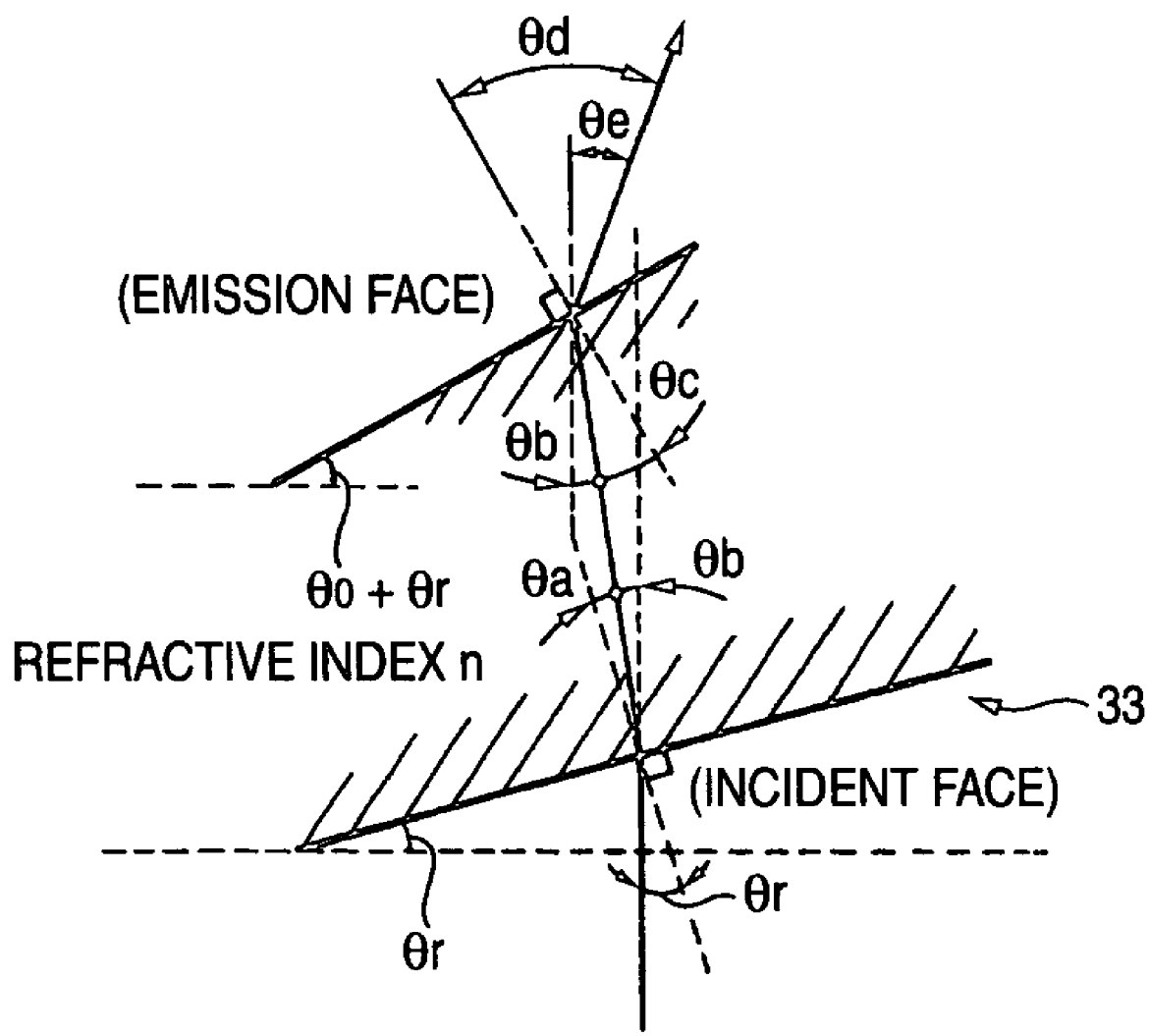
FIG. 5 is an enlarged view showing a main part of a minute transparent optical member shown in FIGS. 4A to 4D.

FIGS. 4A to 4D are diagrams showing the principle of emission angle control on the basis of inclination displacement of the transmission type spatial light modulator shown in FIG. 1, and FIG. 5 is an enlarged view showing the main part of the minute transparent optical member shown in FIG. 1. At least the deflecting portion 39 of the minute transparent optical member 33 has a refractive index n larger than 1, and the light incident face and the light emission face are formed of non-parallel faces. The minute transparent optical member 33 is formed of a structure having a single refractive index, whereby the spatial light modulator can be easily formed. Furthermore, the emission angle of the deflected light can be freely set by merely controlling the design of the inclination angle (prism angle) of the light incident face and the light emission face, and the spatial light modulator having a desired deflection angle can be easily manufactured.

When the minute transparent optical member 33 is rotated in the positive direction (clockwise direction) from the initial state that the inclination angle θr shown in FIG. 4B is equal to zero, the transmission type spatial light modulator 100 is set to a state shown in FIG. 4A, and incident light is incident to the emission face substantially vertically, so that the deflection angle difference is small. On the other hand, when it is rotated in the negative direction (counterclockwise direction), the transmission type spatial light modulator 100 is set to a state shown in FIG. 4C, the emission angle of the deflected light is greatly varied, and when the inclination angle θr is larger than the critical angle θcc, the transmission type spatial light modulator 100 is set to a state shown in FIG. 4D, so that the incident light L1 is totally reflected by the emission face, and thus is not emitted from the emission face.

The emission angle θe of the deflected light can be controlled by using the prism angle θo, the inclination angle θr and the refractive index n as parameters. That is, these values and the emission angle θe are associated with each other as shown in FIG. 5. That is, $$\theta a = \arcsin(\sin\theta r / n)$$
$$\theta b = \theta r - \theta a$$
$$\theta c = \pi/2 - \theta b - (\pi/2 - \theta o - \theta r)$$
$$= \theta o + \theta r - \theta b$$
$$= \theta o + \theta a$$
$$\theta d = \arcsin(n\sin\theta c)$$

Accordingly, the emission angle θe is represented as follows:

$$\theta e = \theta d - (\theta b + \theta c)$$
$$= \theta d - (\theta o + \theta r)$$
$$= \arcsin(n\sin\theta c) - (\theta o + \theta r)$$
$$= \arcsin(n\sin(\theta o + \theta a)) - (\theta o + \theta r)$$
$$= \arcsin[n\sin\{\theta o + \arcsin(\sin\theta r / n)\}] - (\theta o + \theta r)$$

Figure 6:
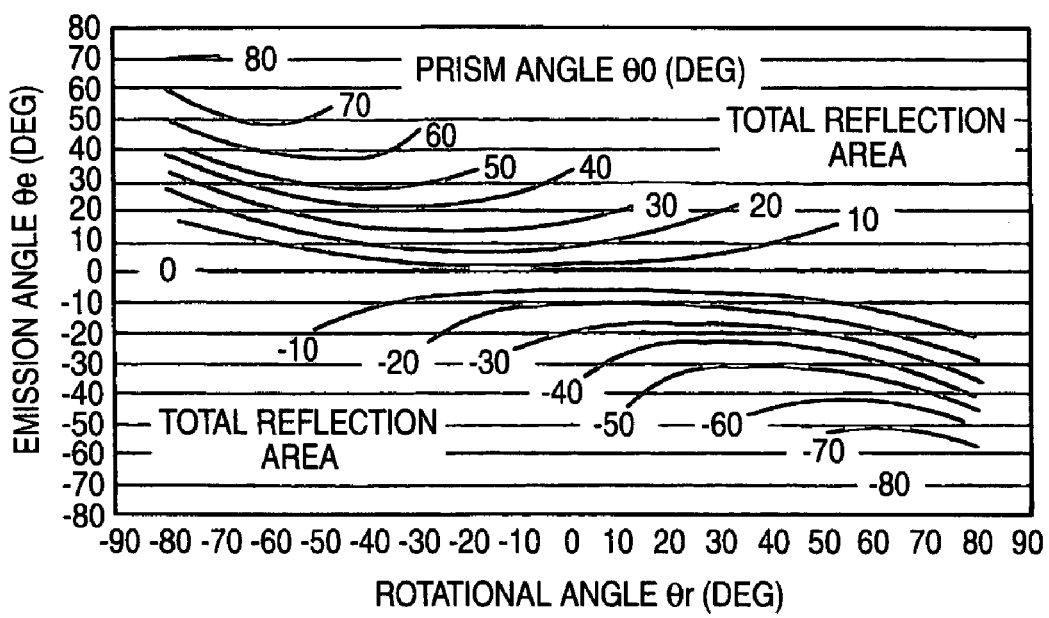
FIG. 6 is a diagram showing the correlation between the emission angle and the rotational angle in the transmission type spatial light modulator (in the case of refractive index n=1.5) shown in FIG. 1.
Figure 7:
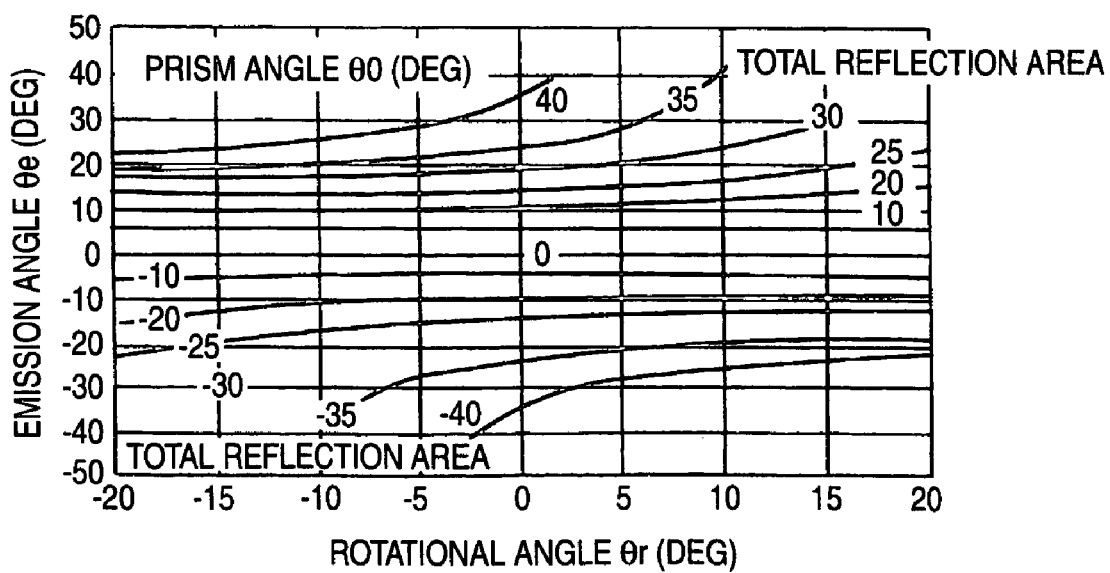
FIG. 7 is an enlarged view showing a main range of FIG. 6.
Figure 8:
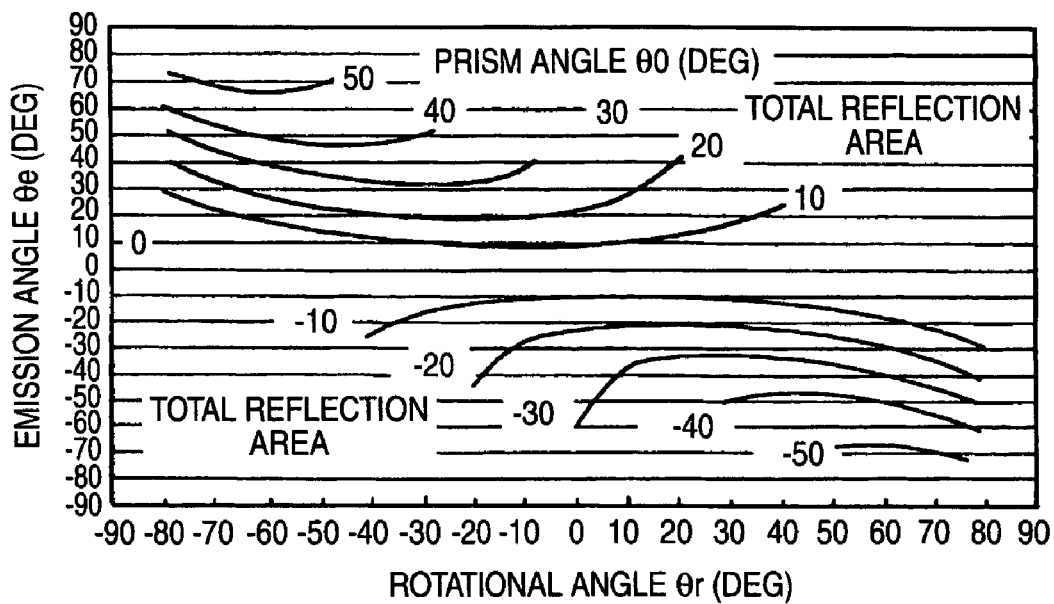
FIG. 8 is a diagram showing the correlation between the emission angle and the rotational angle in the transmission type spatial light modulator (in the case of the refractive index n=2.03) shown in FIG. 1.
Figure 9:
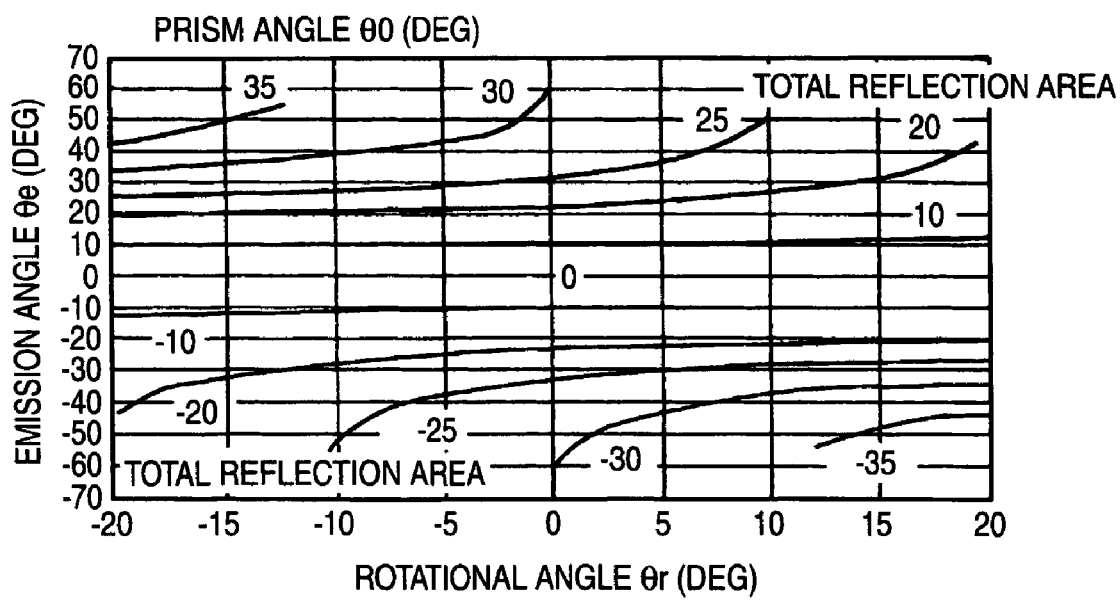
FIG. 9 is an enlarged view showing a main range of FIG. 8.

FIG. 6 is a diagram showing the correlation between the emission angle θe and the rotational angle (inclination angle) θr based on the above calculation equations every prism angle θo=10° in the case of the refractive index n=1.5, and FIG. 7 is an enlarged view of the main part range of FIG. 6. FIG. 8 is a diagram showing the correlation between the emission angle θe and the rotational angle (inclination angle) θr every prism angle θo=100 in the case of the refractive index n=2.03, and FIG. 9 is an enlarged view of the main part range of FIG. 8.

In order to drive the transmission type spatial light modulator 100 at high speed, it is more advantageous to set the inclination angle θr to a value which is as small as possible. Therefore, the inclination angle θr =±15° is set to the upper limit of the driving range, and the prism angle θo is set to 30°, whereby 30° can be secured as the emission angle θo in the case of the refractive index n=1.5 (FIG. 6, FIG. 7). That is, the deflected light of the emission angle 30° is set as ON light (or OFF light), and the deflected light of the emission angle of 15° to 20° (see FIGS. 3B and 3C) is set to OFF light (or ON light), whereby the ON light and the OFF light can be easily discriminated from each other.

A higher advantage could be achieved by forming the transmission type spatial light modulator 100 of a material having a high refractive index. FIGS. 8 and 9 show an example of the refractive index n=2.03, and as compared with FIGS. 6 and 7, it is sufficient to set the prism angle θo to 20° in order to secure the same emission angle θe =30°, so that the deflecting portion 39 ca be easily manufactured. As compared with FIGS. 6 and 7, when the deflecting portion 39 having the same prism angle is used, the driving range of the inclination angle can be further narrowed, and the higher speed driving can be performed. Furthermore, by securing a larger emission angle θe, the discrimination between the ON light and the OFF light can be further easily performed.

The following materials are used as the material having a high refractive index.

$Al_2O_3$: n=1.67
$SiN_x$: n=2.03
$TiO_2$: n=2.28
DLC: n=2.4
$Ta_2O_5$: n=2.14
ITO: n=2.00

FIGS. 8 and 9 show the example of $SiN_x$ having the refractive index n=2.03. $SiN_x$ is transparent over the range from the ultraviolet area to the infrared area and suitable for the semiconductor process, and also the stress control of the structure can be performed. Therefore, it is suitably used as the transmission type spatial light modulator 100, so that it makes easy to manufacture a deflecting portion 39 having a prism angle θo of 25 to 30° and a rotational angle θr=±(5 to 15°).

When the prism angle θo is equal to 30°, the practical shape of the deflecting portion 39 may be designed so that light is totally reflected at the prism emission interface for the rotational angle θr=+0° or more, and light is transmitted at an emission angle θe=+40° and at the rotational angle θr=−5°. This shape will be described with respect to another embodiment described later.

Figure 10:
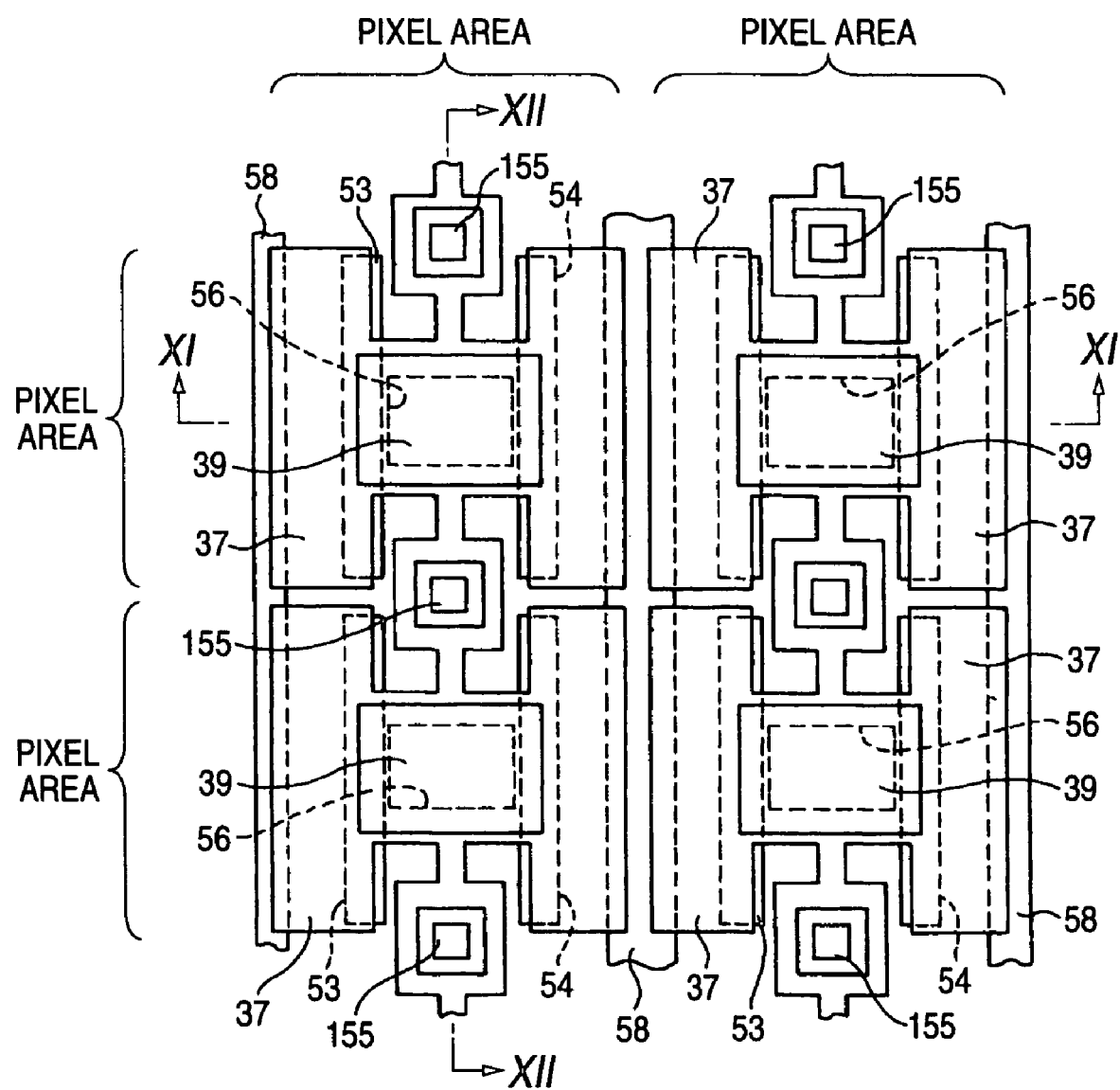
FIG. 10 is a plan view showing transmission type spatial light modulators shown in FIG. 1 which correspond to four pixels.
Figure 11:
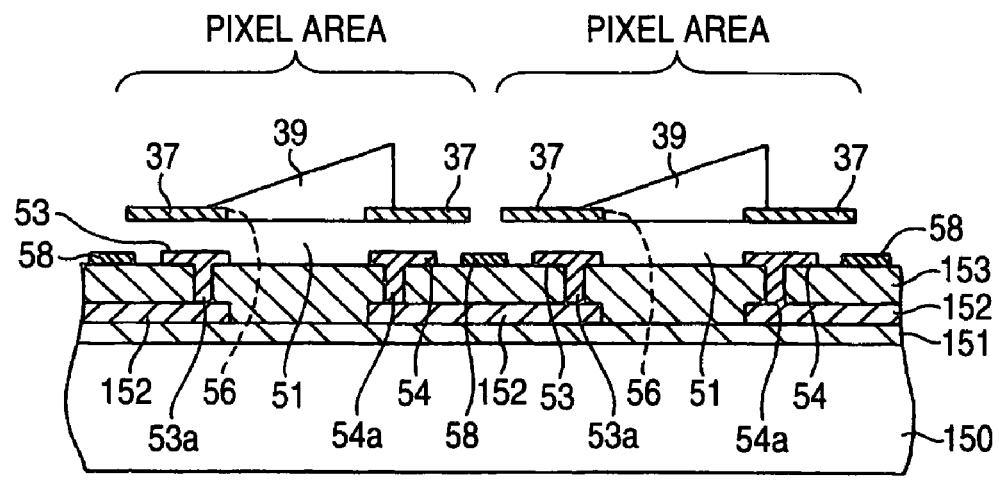
FIG. 11 is a cross-sectional view taken along XI-XI line of FIG. 10.
Figure 12:
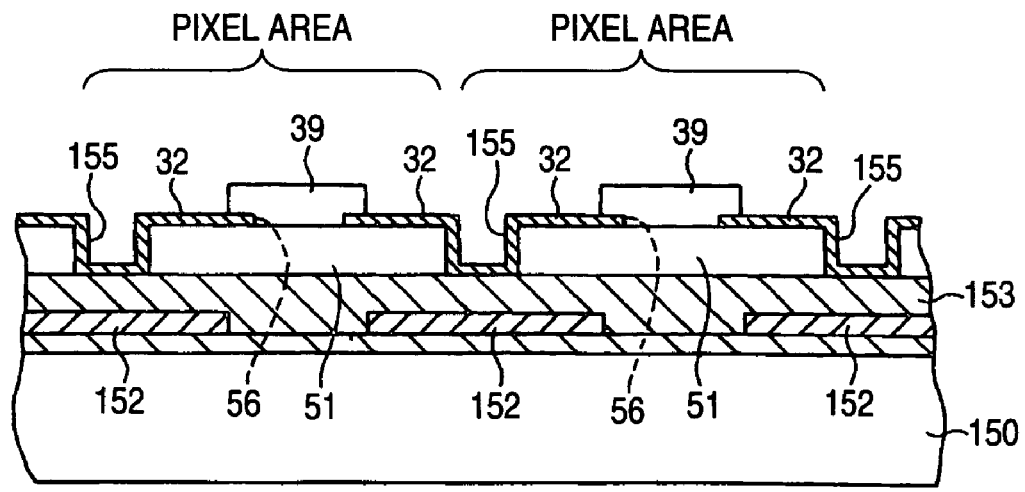
FIG. 12 is a cross-sectional view taken along XII-XII line of FIG. 10.

FIG. 10 is a plan view showing transmission type light modulators 100 of four pixels which are manufactured on a semiconductor substrate, FIG. 11 is a cross-sectional view taken along XI-XI line of FIG. 10 and FIG. 12 is a cross-sectional view taken along XII-XII line of FIG. 10.

A first insulating layer 151 of $SiO_2$ or the like is formed on a transparent substrate 150 of glass, quartz or the like, a driving circuit 152 based on a CMOS circuit is formed on the first insulating layer 151 by an Si semiconductor process, and a second insulating layer 153 of $SiO_2$ or the like is formed on the driving circuit 152. The driving circuit 152 is provided so that it is avoided from being provided just below the deflecting portion 39 comprising the transparent structure.

Metal film of aluminum or the like is laminated on the second insulating layer 153, and the metal film is subjected to patterning, so that the lower electrodes 53, 54 are provided every pixel. Furthermore, stopper film 58 is also formed from the metal film, and the end portion of the movable film 37 abuts against the stopper film 58 when the movable film 37 is inclined. The lower electrodes 53, 54 are connected to the driving circuit 152 through contact holes 53a, 54a provided in the second insulating layer 153, respectively.

Electrically conductive film is formed above the lower electrodes 53, 54 through a gap 51, and the electrically conductive film thus formed is subjected to patterning so that the movable film 37 of each pixel, hinges 32 linked to the movable film 37 and support portions 155 for supporting the movable film 37 through the hinges 32 on the transparent substrate 150. A method of forming the electrically conductive film will be described later. A through hole 56 is formed at the center portion of the movable film 37 of each pixel, and the deflecting portion 39 formed of the transparent structure is formed above the through hole 56.

The above structure is formed so that one deflecting portion 39 is provided every pixel, and these pixels are arranged one-dimensionally or two-dimensionally on the substrate, thereby constituting an spatial light modulation array. It is practically preferable that a one-pixel area is equal to 10 µm to 100 µm in square, and the opening portion (through hole 56) is equal to 4 µm to 80 µm in square, however, they are not limited to these sizes.

Figure 13A:
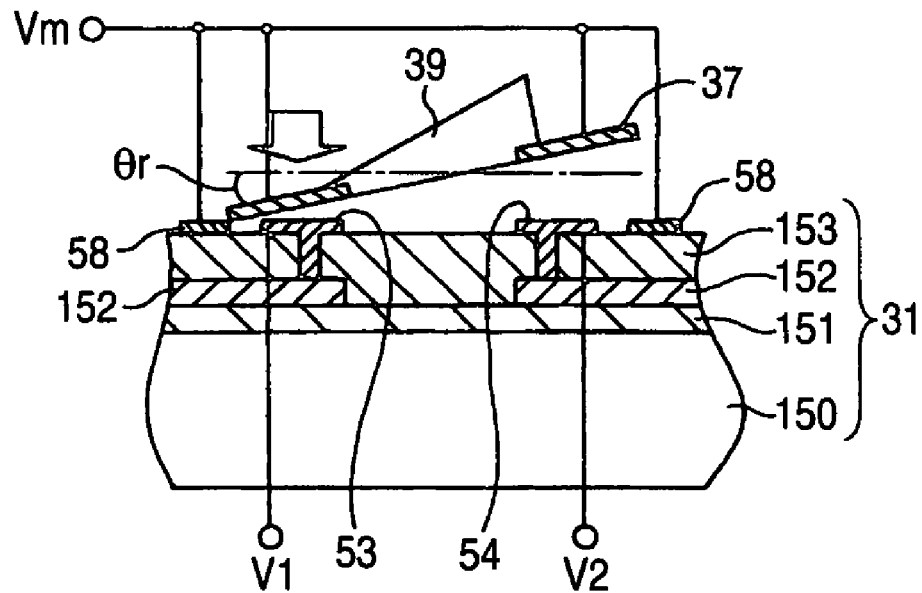
FIGS. 13A and 13B are diagrams showing the operation of the transmission type spatial light modulator shown in FIG. 1.
Figure 13B:
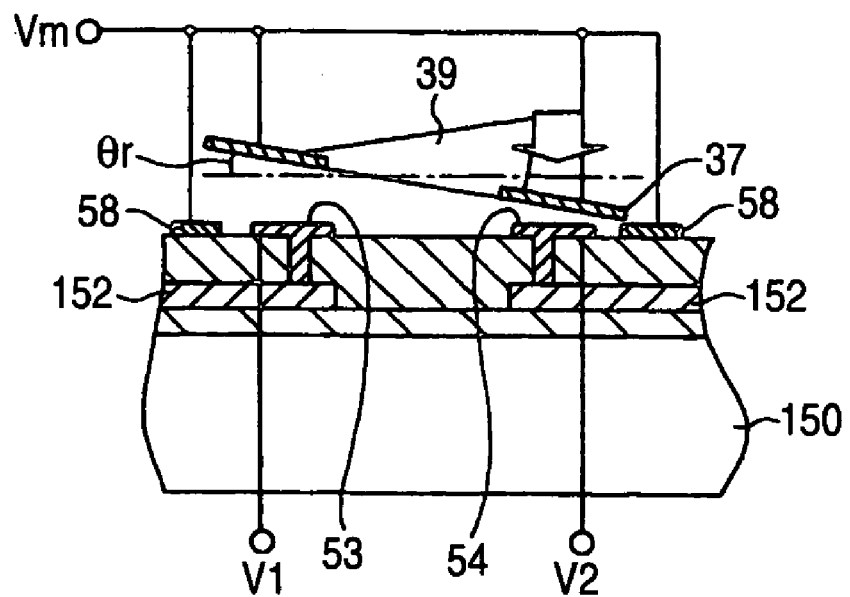

FIGS. 13A and 13B are diagrams showing the operation of the transmission type light modulator 100. When a potential difference is applied to the lower electrodes 53, 54 with respect to the movable film 37, electrostatic force occurs in the movable film 37, and a rotational torque works around the hinge 32. Accordingly, by controlling the potentials V1, V2 of the respective electrodes 53, 54, the movable film 37 can be obliquely displaced to the right and left sides. At this time, the deflecting portion 39 is formed integrally with the movable film 37, and thus the deflecting portion 39 is obliquely displaced in conformity with the oblique displacement of the movable film 37. The inclination angles of the movable film 37 and the deflecting portion 39 are determined by the electrostatic force acting on each movable film 37 and the elastic force of the hinge 32.

The output of the driving circuit 152 which can be independently controlled every pixel is connected to the lower electrodes 53, 54 provided every pixel, and the potentials V1, V2 are applied to the lower electrodes 53, 54. The movable film 37 is electrically connected to the stopper film 58 on the substrate 150 through the hinge 32 and the support portion 155, and a potential Vm is applied to the movable film 37. The supply of the potentials V1, V2 is controlled by the driving circuit 152, and for example 0V or 5V digital potential is supplied according to an image signal. In order to obliquely control the movable film 37 at a higher speed, it is preferable to carry out low-voltage digital driving of 0V or 3V.

The potential Vm may be controlled to be supplied from the driving circuit 152 provided every pixel or every plural pixels, or it may be controlled to be supplied from a common driving circuit of the whole array device. Furthermore, it may be controlled to be supplied from a circuit at the outside of the array device. The potential Vm is preferably controlled by analog potential. Here, when the absolute value of the potential difference between the movable film 37 and the electrode 53, 54 is represented by V(1), V(2), the relationship with the control potential is represented as follows:

$$V(1)=|Vm-V1|$$

$$V(2)=|Vm-V2|$$

For V(1)=V(2)=0, external force occurring in the movable film 37 is equal to zero, and the state when the device has been formed is kept. That is, the movable film 37 and the deflecting portion 39 are substantially horizontal to the substrate 150. This state is stabilized by the elastic force of the hinge 32.

For V(1)=V(2)≠0, the electrostatic force occurring in the movable film 37 is also symmetrical with respect to the hinge 32; Therefore, the state at the formation time of the device is kept, and the movable film 37 and the deflecting portion 39 are substantially horizontal to the substrate 150.

When at least one of V(1) and V(2) is not equal to zero and also they are different from each other, the electrostatic force occurring in the movable film 37 is asymmetrical with respect to the hinge 32. Accordingly, the movable film 37 and the deflecting portion 39 are obliquely displaced with respect to the substrate 150. For example, in the case of V(1)>V(2), the electrostatic force acting between the electrode 53 and the left side of the movable film 37 is larger than the electrostatic force acting between the electrode 54 and the right side of the movable film 37 as shown in FIG. 13(a), and the movable film 37 is inclined to the left side. That is, it is rotated in the counterclockwise direction. Conversely, in the case of V(1)<V(2), the electrostatic force acting between the electrode 54 and the right side of the movable film 37 is larger than the electrostatic force acting between the electrode 53 and the left side of the movable film 37 as shown in FIG. 13(b), and thus the movable film 37 is inclined to the right side. That is, it is rotated in the clockwise direction. Accordingly, by properly controlling V(1) and V(2), the inclination angle θr of the movable film 37, that is, the deflecting portion 39 can be freely controlled.

When V(1) or V(2) is sufficiently high and the electrostatic force contributing to the oblique displacement is larger than the elastic force of the hinge 32 or the electrostatic force occurring in the opposite direction, the movable film 37 and the deflecting portion 39 are obliquely displaced so that the end portion of the movable film 37 comes into contact with the stopper film 58. Accordingly, the inclination angle at this time is geometrically determined by the length of the movable film 37 from the center portion of the hinge and the gap distance till the substrate. By properly selecting these shapes, a desired inclination angle can be freely designed. Here, even when the end portion of the movable film 37 comes into contact with the stopper film 58, no short-circuit current flows because they are set to the same potential.

The present invention is not limited to the device construction, the electrode construction and the driving method of the above embodiment, and any construction may be adopted insofar as it is conformed with the subject matter of the present invention. For example, the device may be designed so that the inclination is carried out not by the vibration of the hinge, but by slack of a rib on which the end portion is supported. Furthermore, a driving electrode may be provided above the movable film 37 to intensify the electrostatic force (an embodiment having this construction will be described later). Furthermore, the movable film 37 may be driven in non-contact with the substrate 150 without providing any stopper film 58.

Figure 14A:
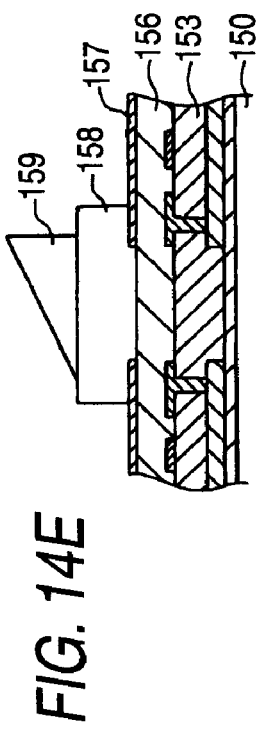
FIGS. 14A to 14H are diagrams showing the manufacturing process of the transmission type spatial light modulator shown in FIG. 1 in the same cross-sectional view as FIG. 11.

FIGS. 14A to 14H and FIGS. 15A to 15H are diagrams showing the manufacturing process of the transmission type spatial light modulator shown in FIGS. 10 to 12. FIGS. 14A to 14H show the manufacturing process in the same cross-sectional view as FIG. 11, and FIGS. 15A to 15H show the manufacturing process in the same cross-sectional view as FIG. 12. FIGS. 14A and 15A are cross-sectional views showing the same manufacturing process. The same is applied to B to H.

First, as shown in FIG. 14A and FIG. 15A, the first insulating layer 151, the driving circuit 152 formed of CMOS and the second insulating layer 153 are formed and laminated, the electrically conductive film is formed on the second insulating layer 153 and the stopper film 58 and the electrodes 53, 54 are patterned from the electrically conductive film.

In order to form the driving circuit 152 of CMOS on the transparent substrate 150, the following method is used. First, the driving circuit 152 of CMOS is formed on an SOI (Si on Insulator) substrate by an Si semiconductor process, and then the Si substrate is exfoliated from the insulating layer 15 below the driving circuit 152. The driving circuit 152 and the insulating later 151 thus exfoliated are substituted onto a transparent substrate 150 by a transfer method or the like. Alternatively, the first insulating layer 151 is formed on the transparent substrate 150, and then TFT (Thin Film Transistor) is directly formed to form the driving circuit 152.

SiO$_2$ is formed on the driving circuit 152 thus formed by PECVD to form the second insulating layer 153. The contact holes 53a, 54a for connecting the output of the driving circuit 152 to each of the electrodes 53, 54 are formed by a patterning treatment using photolithography and fluorine-based RIE etching. TiN thin film is formed as base film by sputtering (not shown), and subsequently tungsten (W) is formed by sputtering, whereby tungsten is embedded in the contact holes 53a, 54a.

Furthermore, the surface thereof is flattened to form the flat second insulating layer 153 having the contact holes 53a, 54a embedded with tungsten. Al serving as the electrically conductive film (preferably Al alloy containing metal having high melting point) is formed on the second insulating layer 153 by sputtering, and patterned into a desired electrode shape by photolithography and chlorine-based RIE etching, thereby forming the driving electrodes 53, 54 and the stopper film 58. At this time, the driving electrodes 53, 54 are connected to the output of the driving circuit 152 through the contact holes 53a, 54a.

Figure 14B:
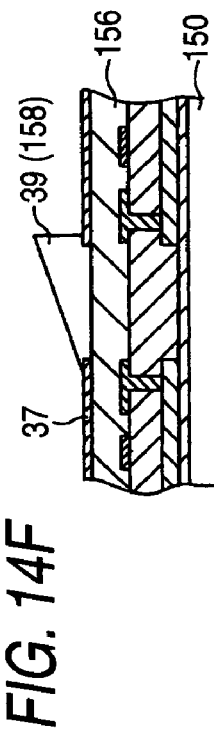
Figure 15E:
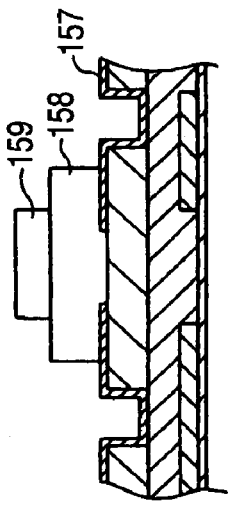
FIGS. 15A to 15H are diagrams showing the manufacturing process of the transmission type spatial light modulator shown in FIG. 1 in the same cross-sectional view as FIG. 12.
Figure 15F:
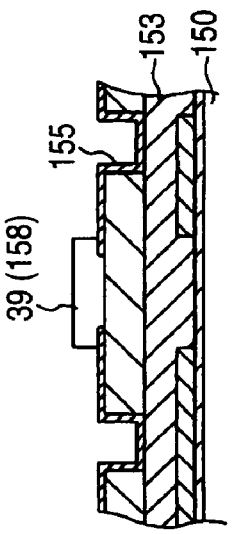
Figure 15G:
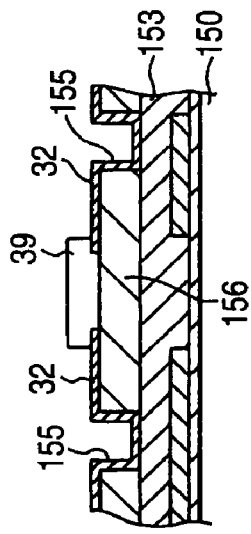
Figure 15H:
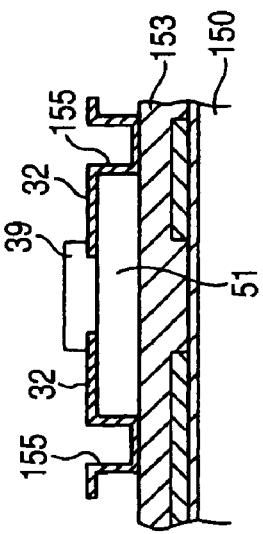
Figure 15A:
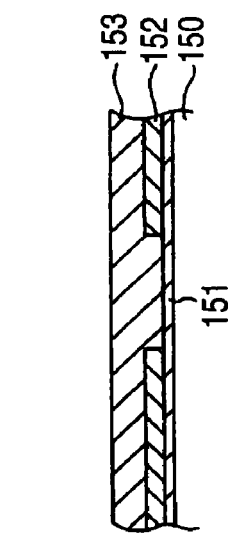
Figure 15B:
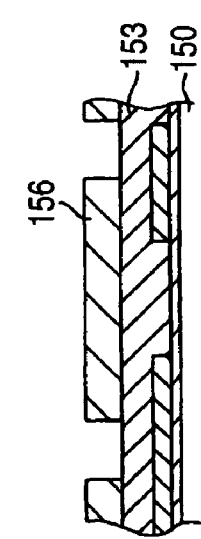

Subsequently, as shown in FIG. 14B and FIG. 15B, positive type resist film 156 is coated on the surface, and a portion thereof which will serve as the support portion 155 of the hinge 32 is patterned by photolithography and then subjected to hard-baking. The hard-baking is carried out at a temperature higher than 200° C. while DeepUV is irradiated. Accordingly, the shape thereof is kept even in the subsequent high-temperature process, and it is insoluble by resist exfoliating solvent. By coating and forming resist film, the resist surface is flattened irrespective of any step of the base film. The resist layer functions as a sacrifice layer, and is removed in the subsequent process. Accordingly, the film thickness of the resist after the hard-baking determines the gap 51 (see FIG. 2A) between the future lower electrodes 53, 54 and the hinge 32 (and the movable film 37).

Figure 14C:
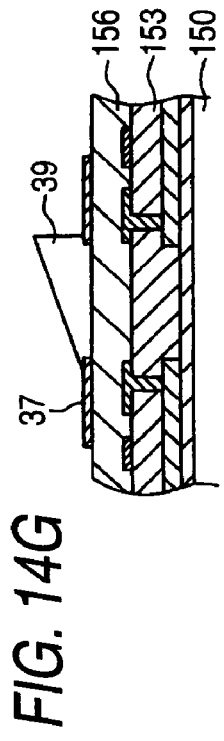
Figure 15C:
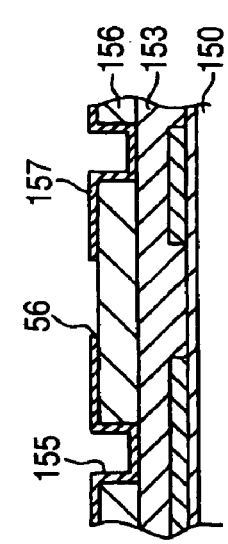

Subsequently, as shown in FIG. 14C and FIG. 15C, electrically conductive film 157 of Al (preferably, Al alloy containing metal having a high melting point) is formed by sputtering, and only an opening portion (through hole 56 of FIG. 1 and FIG. 10) is patterned into a desired shape by photolithography and chlorine-based RIE etching.

Figure 14D:
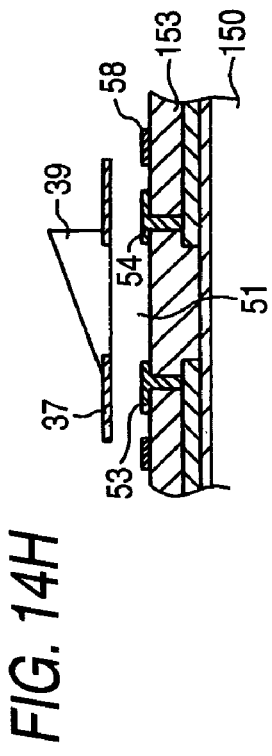
Figure 15D:
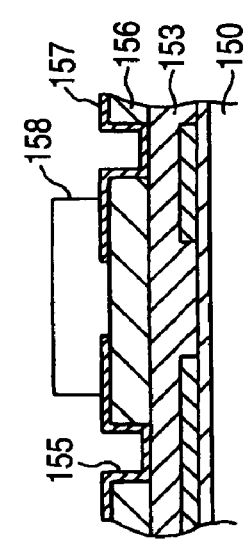

Subsequently, as shown in FIG. 14D and FIG. 15D, a transparent insulator formed of siO$_2$ which will serve as the deflecting portion 39 is formed by PECVD, and subjected to a patterning so as to cover the periphery of the opening portion 56 by photolithography and fluorine-based RIE etching.

Figure 14E:
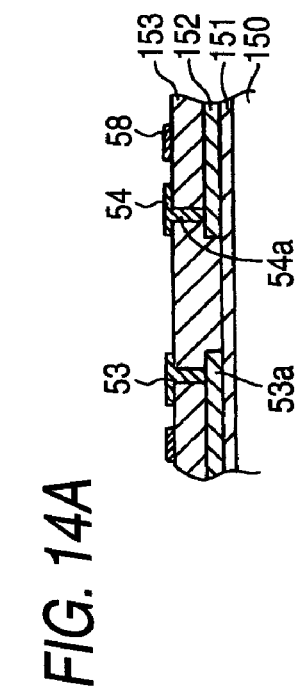

Subsequently, as shown in FIG. 14E and FIG. 15E, positive type resist film 159 is coated, and a resist structure 159 having the same shape as the deflecting portion 39 having a desired shape (a right triangular prism shape in the example of the figures) is formed on the transparent insulator 158 on the opening portion 56 by photolithography based on a gray-scale photomask.

Figure 14F:
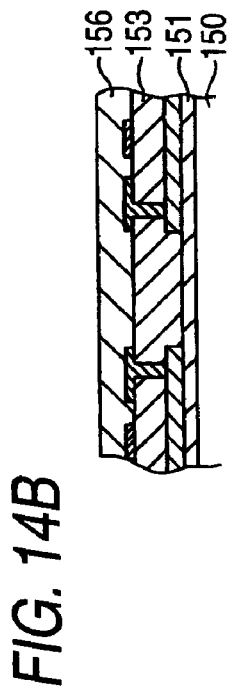

Subsequently, as shown in FIG. 14F and FIG. 15F, the transparent insulator 158 is formed to have the same shape as the deflecting portion 39 by fluorine-based RIE etching. That is, the shape of the resist structure 159 is transferred to the transparent insulator 158 to thereby forming the deflecting portion 39.

Figure 14G:
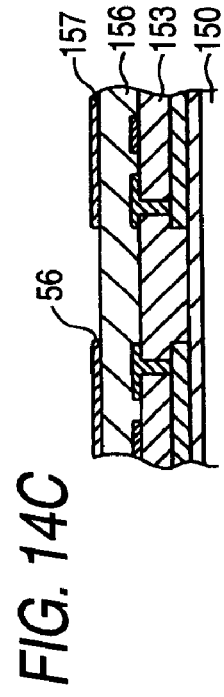

Subsequently, as shown in FIG. 14G and FIG. 15G, the electrically conductive film 157 is patterned by photolithography and chlorine-based RIE etching to form the hinge 32, the support portion 155 and the movable film 37 from the electrically conductive film 157.

Figure 14H:
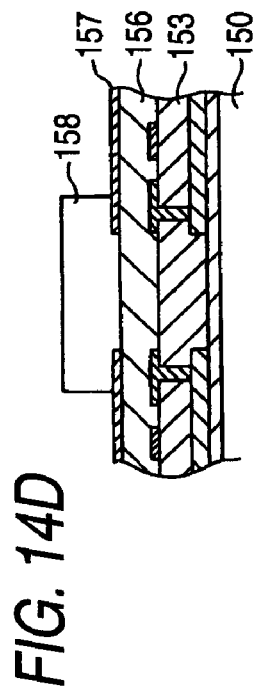

Finally, as shown in FIG. 14H and FIG. 15H, the resist layer 156 serving as the sacrifice layer is removed by oxygen-based plasma etching (ashing) to form the gap 51, thereby forming an spatial light modulator having a desired structure.

Figure 16:
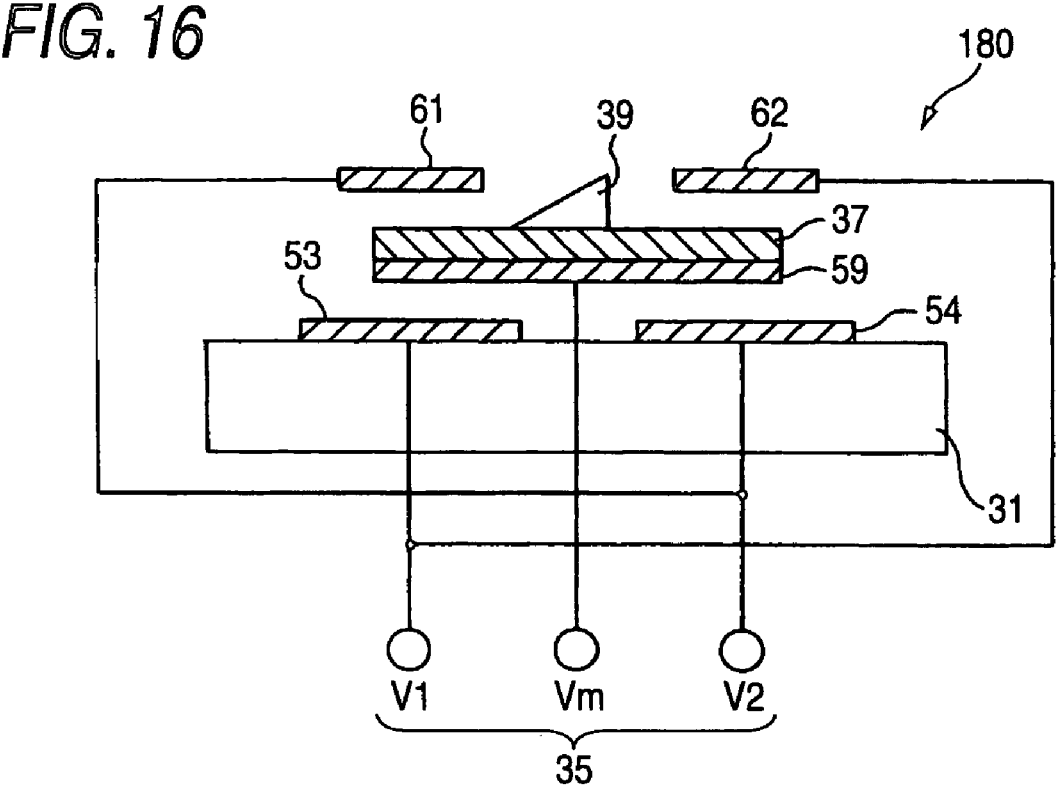
FIG. 16 is an electrode wire diagram showing a second embodiment of the transmission type spatial light modulator of the present invention.
Figure 17:
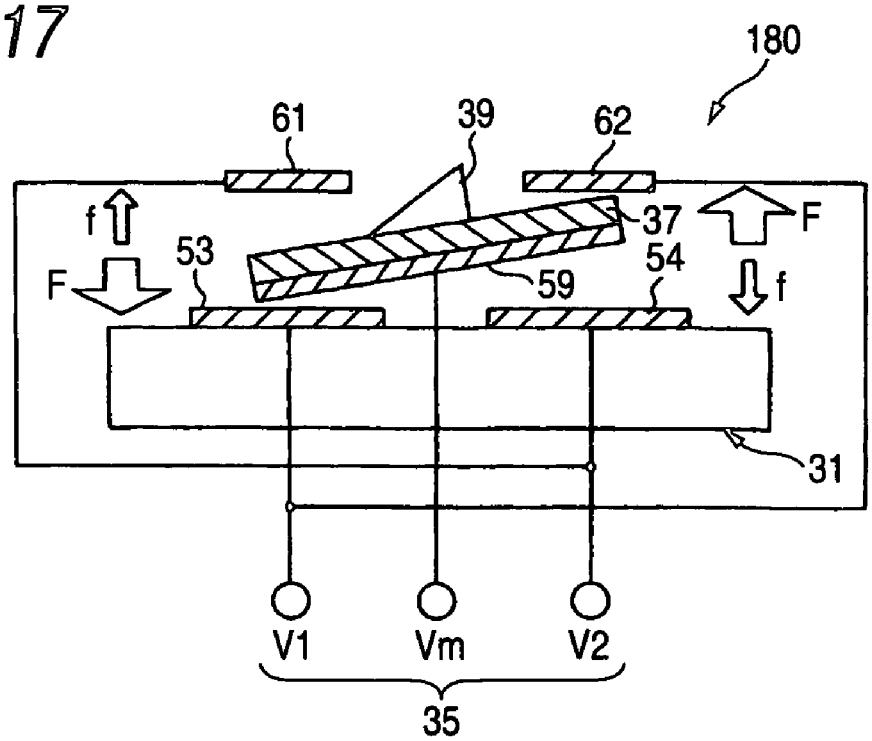
FIG. 17 is a diagram showing the operation representing a left-side inclination condition of the transmission type spatial light modulator shown in FIG. 16.
Figure 18:
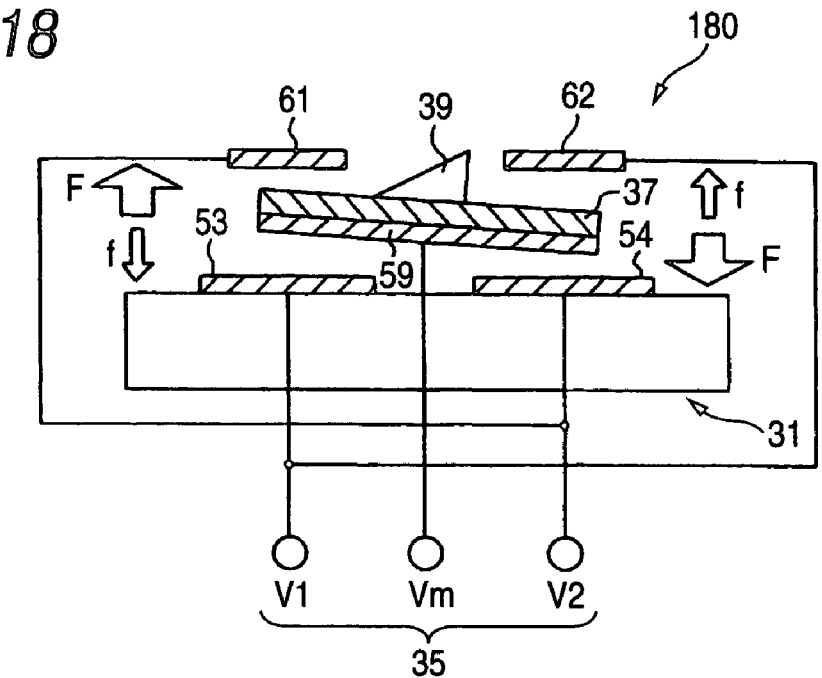
FIG. 18 is a diagram showing the operation representing a right-side inclination condition of the transmission type spatial light modulator shown in FIG. 16.

FIG. 16 is a diagram showing a transmission type spatial light modulator 180 according to a second embodiment of the present invention. The transmission type spatial light modulator 180 of the second embodiment is different from the transmission type spatial light modulator 100 on in the construction of the driving member. FIG. 17 shows a left-side inclination state (counterclockwise rotation state) of the transmission type spatial light modulator, and FIG. 18 shows a right-side inclination state (clockwise rotation state) of the transmission type spatial light modulator 180.

In the first embodiment, only the lower electrodes 53, 54 are provided as the driving member 35. However, in this embodiment, in addition to the lower electrodes 53, 54, upper electrodes 61 and 62 are disposed at both the sides of the hinge 32 (not shown) so as to sandwich the movable film 37 therebetween. In the example shown in FIG. 16, electrically conductive film 59 is formed on the whole lower surface of the movable film 37 because the movable film 37 is formed of insulating film, however, the movable film 37 itself may be formed of electrically conductive film as in the case of the first embodiment.

That is, in the transmission type spatial light modulator 180 of this embodiment, two lower electrodes 53, 54 are arranged around a hinge at the lower side of the movable film 37 constituting a minute transparent optical member 33, and also two upper electrodes 61, 62 are arranged around a hinge at the upper side of the movable film 37. That is, the torsion center of the hinge is located at the cross point between a pair of diagonal lines connecting diagonal electrodes (the lower electrodes 53, 54, the upper electrodes 61, 62) arranged at the four sides of upper and lower and right and left sides. Accordingly, the electrostatic force is effectively applied to the movable film 37 around the torsion center axis. The minute transparent optical member 33 can be actively driven to be clockwise rotated and counterclockwise rotated by the electrostatic force based on the electrodes arranged at the upper and lower sides.

As the basic operation, the transmission type spatial light modulator 180 swings and displaces the minute transparent optical member 33 by applying voltages to the lower electrodes 53, 54, the upper electrodes 61, 62 and the electrically conductive film 59.

In the transmission type spatial light modulator 180, when a potential difference is applied to the first lower electrode 5, the second lower electrode 54, the first upper electrode 61 and the second upper electrode 62 with respect to the electrically conductive film 59, electrostatic force occurs between each electrode and the electrically conductive film 59, and a rotational torque works around the torsion center axis of the hinge. Accordingly, by controlling the potentials of the respective electrodes, the deflecting portion 39 can be rotationally displaced clockwise or counterclockwise.

For example, as shown in FIG. 16, the potential V1 is applied to the first lower electrode 53, the second upper electrode 62, and the potential V2 is applied to the second lower electrode 54 and the first upper electrode 61, and the potential Vm is applied to the electrically conductive film 59.

Here, the potential difference of V1 from Vm is represented by V(1) and the potential difference of V2 from Vm is represented by V(2). For V(1)=V(2)=0, the external force occurring in the minute transparent optical member 33 is equal to zero, the state at the time when the device is formed is kept, and the minute transparent optical member 33 is substantially horizontal to the substrate 31 as shown in FIG. 8. This state is stabilized by the elastic force of the hinge.

For V(1)=V(2)≠0, the electrostatic force occurring in the minute transparent optical member 33 is symmetrical with respect to the torsion center of the hinge, the state at the time when the device is formed is also kept, and the minute transparent optical member 33 is substantially horizontal to the substrate 31.

When at least one of V(1) and V(2) is equal to zero and they are different from each other, the electrostatic force occurring in the minute transparent optical member 33 is asymmetrical with respect to the torsion center axis of the hinge, and the minute transparent optical member 33 is inclined with respect to the substrate 31.

For example, for V(1)>V(2), the electrostatic force F generated by the first lower electrode 53 and the second upper electrode 62 is larger than the electrostatic force f generated by the second lower electrode 54 and the first upper electrode 61, and the minute transparent optical member 33 is inclined to the left side as shown in FIG. 17. Conversely for V(1)-<V(2), the electrostatic force F generated by the second lower electrode 54 and the first upper electrode 61 is larger than the electrostatic force f generated by the first lower electrode 53 and the second upper electrode 62, and the minute transparent optical member 33 is inclined to the right side.

At this time, in a case where V(1) and V(2) are sufficiently large, the minute transparent optical member 33 can be easily rotationally displaced in any direction from the flat state even when the difference between V(1) and V(2) is small. This means that when the potential to be controlled is set to V1 and V2, the potential difference therebetween may be small. Therefore, the voltage of the control circuit can be reduced, and there is an advantage in cost performance and integration performance.

By properly supplying the potentials to V1, V2, Vm, the minute transparent optical member 33 can be displaced to any position, for example, in a clockwise direction, in a counterclockwise direction and in a flat direction by the electrostatic force occurring in each electrode and the elastic force of the hinge. Furthermore, the driving method at this time may be based on analog control (control for any displacement) or digital control (control for binary displacement).

With respect to the rotational driving operation described above, a proper rotation stopper (for example, the stopper film 58 of the first embodiment) is provided, and the minute transparent optical member 33 is rotationally displaced until it comes into contact with the stopper, whereby the rotational angle can be controlled with high precision. Furthermore, by using the linear area of the voltage-displacement characteristic, the minute transparent optical member 33 can be rotationally displaced so that the minute transparent optical member 33 does not come into contact with the stopper. In this case, there is no contact portion, and thus there occurs no problem such as attachment or the like, and the reliability can be enhanced. The electrode wiring and the displacing operation method of the minute transparent optical member 33 based on each potential control are embodiments, and thus the present invention is not limited to these embodiments.

In the transmission type spatial light modulator 180, the driving member 35 obliquely displaces the minute transparent optical member 33 with the electrostatic force as described above, and thus the high-speed driving, the low-voltage driving and the low power-consumption driving can be performed.

Accordingly, according to the transmission type spatial light modulator 180, the minute transparent optical member 33 for emitting light in a direction different from the incident light L1 is supported by the support member so that it can be inclined, and the minute transparent optical member 33 is obliquely displaced by the electrical mechanical operation of the driving member 35 to thereby vary the light emission direction, so that the direction of the transmitted light and the light amount thereof can be controlled by a small displacement amount, and the high-speed deflection and the low-voltage driving can be implemented. Furthermore, in the case of the reflection type modulator, the light incident path and the light reflection path with respect to the device exist at the same surface side, and thus an optical system is required to avoid the interference between both the paths. However, according to the transmission type spatial light modulator 180 of this embodiment, the emission light is directed to the travel direction of the incident light and thus an optical system which is required in the case of the reflection type modulator is not required, and the construction of the peripheral optical system is simplified, so that the modulator can be miniaturized. Furthermore, as compared with the reflection type modulator, the effective light (ON light) and the unnecessary light (OFF light) can be more easily separated from each other, so that the stray light and the unnecessary light can be suppressed, and the contrast can be enhanced. Furthermore, there can be eliminated the wavelength-dependence which is observed in the interference type spatial light modulator using the Fabry-Perot effect or the like.

Figure 19A:
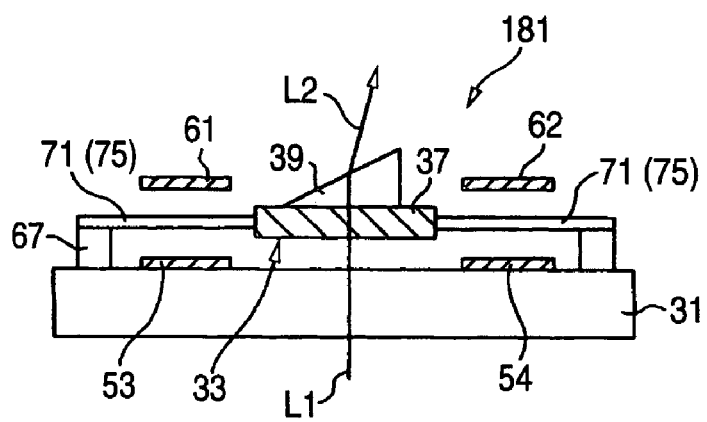
FIGS. 19A and 19B are cross-sectional views representing a modification 1 of the transmission type spatial light modulator shown in FIG. 16 in which a minute transparent optical member is displaced by a flexible flat plate.
Figure 19B:
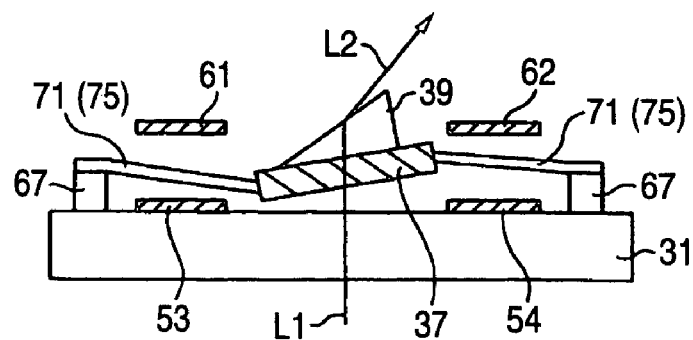
Figure 20:
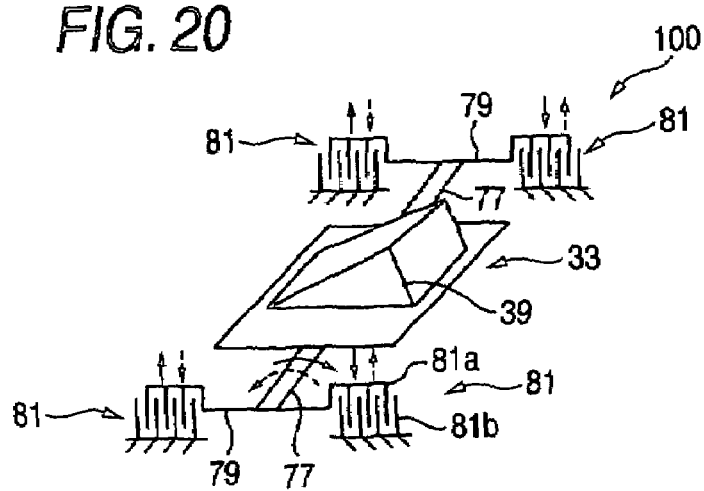
FIG. 20 is a perspective view showing a modification 2 of the transmission type spatial light modulator shown in FIG. 16 which is equipped with a comb-drive.

FIGS. 19A and 19B are cross-sectional views showing a modification 1 of the transmission type spatial light modulator according to the second embodiment in which a flexible flat plate is bent to displace a minute transparent optical member, and FIG. 20 is a perspective view showing a modification 2 of the transmission type spatial light modulator which is equipped with a comb-drive.

The transmission type spatial light modulator 181 can adopts a structure shown in FIG. 19A to drive the minute transparent optical member 33, for example. This driving structure has a minute transparent optical member 33 (comprising the movable film 37 and the deflecting portion 39) for deflecting the incident light L1, at least one flexible flat plate 71 which is pivotably connected to the minute transparent optical member 33 at one end thereof and freely movably connected to the support portion 67 at the other end thereof, fixed electrodes 53, 54, 61, 62 for displacing the minute transparent optical member 33, and a movable electrode 75 provided on the flexible flat plate 71. The fixed electrodes 53, 54, 61, 62 are disposed so as to confront the upper and lower portions of the flexible flat plate 71 through gaps, and fixed to the substrate 31. The flexible flat plate 71 is driven by the electrostatic force acting between the fixed electrodes 53, 54, 61, 62 and the movable electrode 75, thereby obliquely displacing the minute transparent optical member 33.

In this transmission type spatial light modulator 181, when a voltage is applied between the fixed electrode 53, 54, 61, 62 and the movable electrode 75 which connects the minute transparent optical member 33 and the support portion 67 and is provided on the minute transparent optical member 33, electrostatic force is generated between the fixed electrode 53, 54, 61, 62 and the movable electrode 75. The minute transparent optical member 33 is attracted to the substrate 31 (in an upward direction or downward direction), and as a result, the minute transparent optical member 33 is obliquely displaced as shown in FIG. 19B. In order to return the minute transparent optical member 33 to the state of FIG. 19A, the voltage between the movable electrode 75 and the fixed electrode 53, . . . is set to zero.

Furthermore, the transmission type spatial light modulator may adopt a structure as shown in FIG. 20 to drive the minute transparent optical member 33. In the driving structure of the transmission type spatial light modulator 182, the minute transparent optical member 33 is fixed at the center portion of the support member (hinge) 77, and support shafts 79, 79 are fixed to both the ends of a swing shaft 77 so as to be perpendicular to the swing shaft 77. A so-called comb-drive 81 serving as the driving member is provided to each of the end portions of the support shafts 79, 79. In the comb-drive 81, a comb-shaped upper electrode plate 81a and a comb-shaped lower electrode 81b are oriented so that the teeth thereof are mutually engaged with one another, and both the ends of the support shafts 79, 79 are vertically moved by the electrostatic force acting between these confronting electrodes, so that the swing shaft 77 is rotated and the minute transparent optical member 33 can be freely rotated in both the clockwise and counterclockwise directions.

Figure 21A:
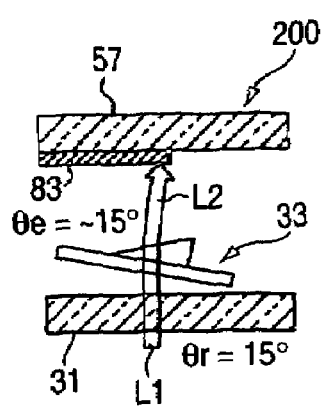
FIGS. 21A to 21C are cross-sectional views showing a third embodiment having a light shielding member.
Figure 21B:
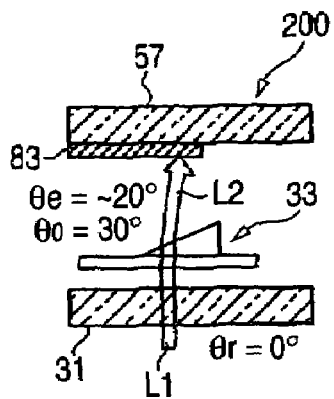
Figure 21C:
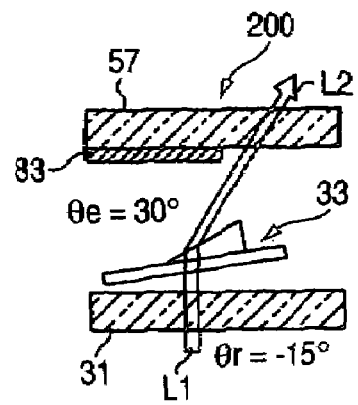
Figure 22A:
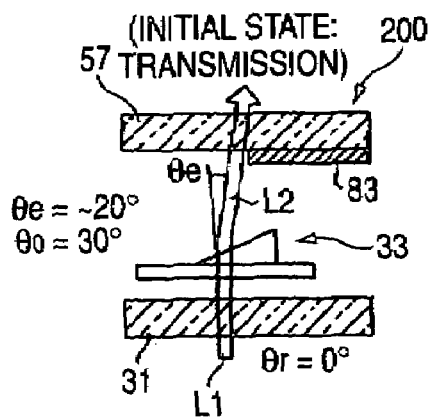
FIGS. 22A and 22B are cross-sectional views showing a modification of the third embodiment in which the position of the light shielding member is different.
Figure 22B:
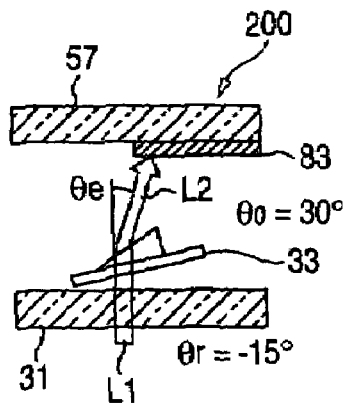

Next, a third embodiment of the transmission type spatial light modulator according to the present invention will be described. FIGS. 21A to 21C are cross-sectional views showing the third embodiment having a light shielding member, and FIGS. 22A and 22B are cross-sectional views showing a modification of the third embodiment in which the position of the light shielding member is different. In the following embodiments and modifications, the same members as shown in FIGS. 1 to 20 are represented by the same reference numerals, and the duplicative description thereof is omitted.

A transmission type spatial light modulator 200 of this embodiment has light shielding member 83 in front of the light emission face of the minute transparent optical member 33. The light shielding member 83 may be light shielding film formed on the front-surface protection substrate 57, for example. The light shielding member 83 shields some emission light in a direction-variable range of light emitted from the minute transparent optical member 33. The light shielding is carried out-by absorption or reflection.

In the transmission type spatial light modulator 200, for example when the prism angle θo of the deflecting portion 39 having a refractive index n=1.5 is formed as shown in FIG. 21B, the inclination angle θr is equal to 0° and the emission angle θe of the deflected light is slightly less than 20° under an initial state where the driving member 35 is not actuated. At this time, the emission light L2 is shielded by the light shielding member 83. Furthermore, the emission angle θe of the deflected light is equal to 15° even when the driving member 35 is actuated and the inclination angle θr is equal to 15° as shown in FIG. 21A, and thus the emission light L2 is shielded by the light shielding member 35. On the other hand, when the driving member 35 is actuated and the inclination angle θr is equal to −15° as shown in FIG. 21C, the emission angle θe of the deflected light is greatly varied to 30°, so that the emission light L2 is out of the light shielding member 83 and thus emitted from the front-surface protection substrate 57.

Furthermore, as shown in FIGS. 22A and 22B, the light shielding member 83 may be provided at the opposite side to that in the case of FIGS. 21A to 21C. In this case, as shown in FIG. 22A, the emission light L2 is shifted out of the light shielding member 83 and made to be emitted from the front-surface protection substrate 57 under the initial state where the driving member 35 is not actuated. Furthermore, as shown in FIG. 22B, when the driving member 35 is actuated and light emitted from the emission face of the minute transparent optical member 33 is greatly deflected, the emission light L2 is shielded by the light shielding member 83.

According to the transmission type spatial light modulator 200, there is provided the light shielding member 83 for shielding some emission light emission light in the direction-variable range of the light emitted from the minute transparent optical member 33. Accordingly, a desired area in the direction-variable range of light emitted from the minute transparent optical member 33 can be set as a light transmissible area or light shielding area. Furthermore, the driving member 35 obliquely displaces the minute transparent optical member 33 to displace the emission light with respect to the light shielding member 83, thereby varying the light amount of transmission light. Therefore, the driving member is made to function as an optical switch which enables ON/OFF of light intensity or switching of a route in cooperation with the light deflecting operation based on the oblique displacement of the minute transparent optical member 33.

Figure 23A:
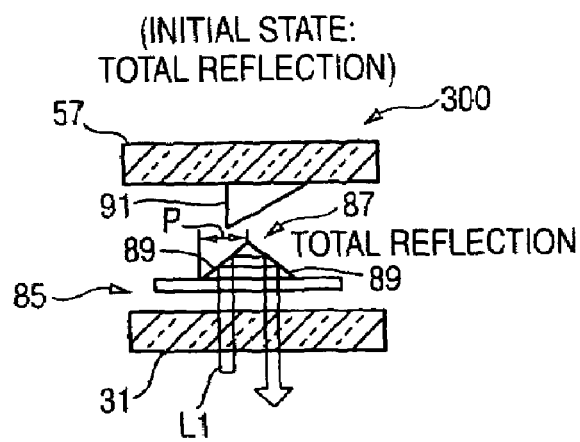
FIGS. 23A and 23B are cross-sectional views showing a fourth embodiment in which the minute transparent optical member has a total reflection face.
Figure 23B:
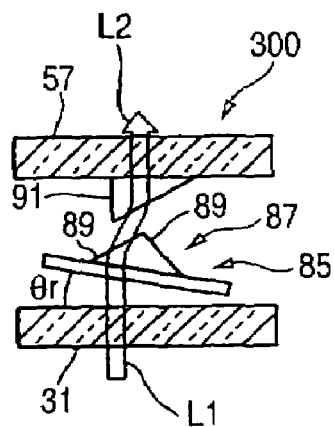
Figure 24A:
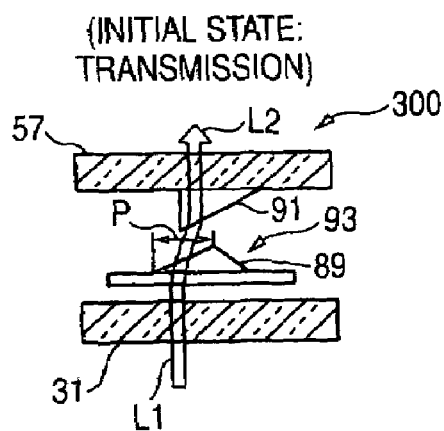
FIGS. 24A and 24B are cross-sectional views showing a modification of the fourth embodiment in which the shape of the minute optical member is different.
Figure 24B:
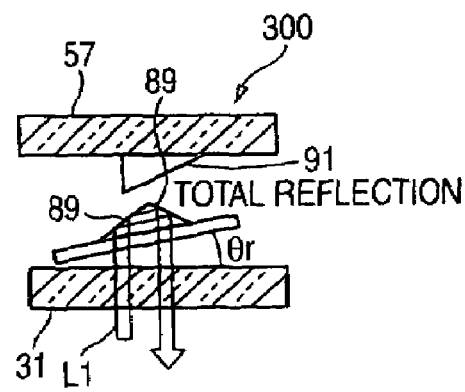

Next, a fourth embodiment of the transmission type spatial light modulator according to the present invention will be described. FIGS. 23A and 23B are cross-sectional views showing the fourth embodiment in which the minute transparent optical member is obliquely driven to emit incident light from the emission face thereof or totally reflect the incident light from the emission face, and FIGS. 24A and 24B are cross-sectional views showing a modification of the fourth embodiment in which the shape of the minute transparent optical member is different.

The transmission type spatial light modulator 300 according to this embodiment is designed so that the emission face 89 of the deflecting portion 87 is swung in the vicinity of the critical angle with respect to the incident light L1. That is, the deflecting portion 87 of this embodiment is formed at the prism angle θo=45°. For example, in the case of glass having a refractive index n=1.5, the total reflection critical angle θcc is equal to about 42°, and the distance p from the prism corner portion to the apex angle portion is set to about 5 μm.

In the transmission type spatial light modulator 300, an optical path correcting member 91 for making the incident angle and the emission angle substantially coincident with each other may be provided in front of the light emission face of the minute transparent optical member 85. A prism is suitably used as the optical path correcting member 91.

In the transmission spatial light modulator 300, under the initial state where the driving member 35 is not actuated, the inclination angle θr=0°, and thus the incident light L1 is incident to the emission face 89 at an angle of 45° larger than the critical angle of 42° as shown in FIG. 23A. Accordingly, the incident light L1 is totally reflected from the emission face 89, and thus no light is emitted from the emission face 89 to the optical path correcting member 91. On the other hand, when the driving member 35 is actuated, as shown in FIG. 23B, the incident angle of the incident light L1 to the emission face 89 is smaller than the critical angle, the emission light L2 passes through the emission face 89 while being bent, further passes through the optical path correcting member 91 and then is emitted in parallel to the incident light L1 (normally-off control).

According to the transmission type spatial light modulator 300, the emission face 89 of the minute transparent optical member 85 is provided in the vicinity of the angle at which the incident light L1 is totally reflected, and also not only the deflection of the incident light L1, but also the total reflection of the incident light L1 can be performed. Accordingly, the deflected light is emitted from the opposite side to the light incident face of the minute transparent optical member 85, and also the reflected light is emitted from the light incident face side of the minute transparent optical member 85, so that the effective light (ON light) and the unnecessary light (OFF light) can be separated to the opposite sides with respect to the minute transparent optical member 85.

Furthermore, the minute transparent optical member 85 is obliquely displaced by the driving member 35 to pass or totally reflect the incident light L1. Accordingly, the ON light and the OFF light can be separated to the opposite sides with respect to the minute transparent optical member 85 by obliquely displacing the minute transparent optical member 85 so that the incident angle of the incident light L1 incident to the emission face 89 is smaller or larger than the critical angle. Since the light is totally reflected at the emission face 89 formed in the minute transparent optical member 85, the total internal reflection (Total Internal Reflection) can be performed, so that light absorption can be reduced as compared with the reflection at the metal surface, and heating or degradation caused by high-intensity light can be prevented. Accordingly, an spatial light modulator adapted to light of a high-output light source can be implemented. Furthermore, the manufacturing process can be simplified as compared with the reflection based on formation of dielectric multilayered film.

Furthermore, the optical path correcting member 91 for making the incident angle and the emission angle substantially coincident with each other is provided in front of the light emission face of the minute transparent optical member 85. Therefore, the emission light L2 (ON light) which is separated to the opposite side to the incident light L1 with respect to the minute transparent optical member 85 can be made to straightly travel in the same direction as the incident light L1. Therefore, the optical design of the device using this modulator can be facilitated.

If a deflecting portion 93 having an asymmetric shape having a prism angle θo of about 35° is adopted as shown in FIGS. 24A and 24B, there could be perform the normally-off control under which the incident light L1 is passed through the emission face 89 under the initial state as shown in FIG. 24A, and the incident light L1 is totally reflected from the emission face 89 under the actuation state of the driving member 35 as shown in FIG. 24B.

Next, a fifth embodiment of the transmission type spatial light modulator according to the present invention will be described. FIG. 25 is a cross-sectional view showing the fifth embodiment using a prism as the minute transparent optical member, FIG. 26 is a cross-sectional view showing a modification 1 of the fifth embodiment in which optical path correcting member is provided, and FIG. 27 is a cross-sectional view showing a modification 2 of the fifth embodiment in which a prism having a parallelogram shape is used.

Figure 25A:
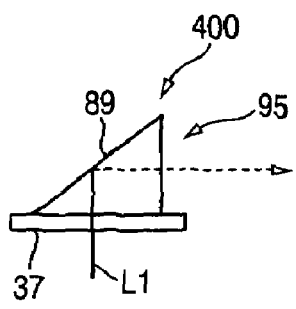
FIGS. 25A to 25D are cross-sectional views showing a fifth embodiment using a prism as the minute transparent optical member.

In the transmission type spatial light modulator 400 of this embodiment, a deflecting portion 95 is designed in a prism-shape of a right-angled triangle having a total reflection face as shown in FIGS. 25A to 25D. In the deflecting portion 95, one of the side portions between which the right angle is sandwiched is parallel to the movable film 37. Accordingly, as shown in FIG. 25A, the incident light L1 incident form the movable film 37 is totally reflected from the total reflection face 89 of the deflecting portion 95 at an angle of 90°, and emitted from the other side portion of the side portions between which the right angle is sandwiched. That is, the incident light L1 is totally reflected by the prism, and deflected in a horizontal direction (in a direction parallel to the substrate 31).

Figure 25B:
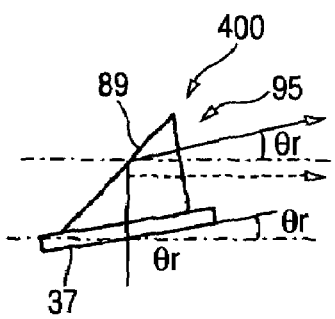
Figure 25C:
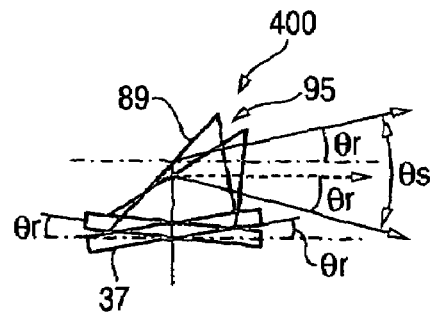
Figure 25D:
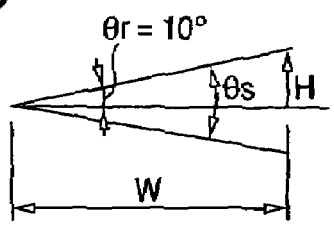

In this transmission type spatial light modulator 400, as shown in FIG. 25B, when the refractive index n=1.5 and the oblique displacement of the movable film 37, the inclination angle θr is equal to 10°, it is equal to 20° by the rotation in the positive and negative direction. In this case, the emission angle θe with respect to the inclination angle θe is also equal to 10°, and the deflection angle θs shown in FIG. 25C is equal to 20°. This means that a larger deflection angle (θs=20°) can be achieved at a smaller inclination angle (2θr=20°) as compared with the transmission type spatial light modulator 100 of the first embodiment which achieves the deflection angle θs=15° at the inclination angle 2θr=30°. Accordingly, a displacement H of 1.8 μm is achieved at the position located at a distance w=5.0 μm from the left end of the deflecting portion 95 as shown in FIG. 25D.

Figure 26:
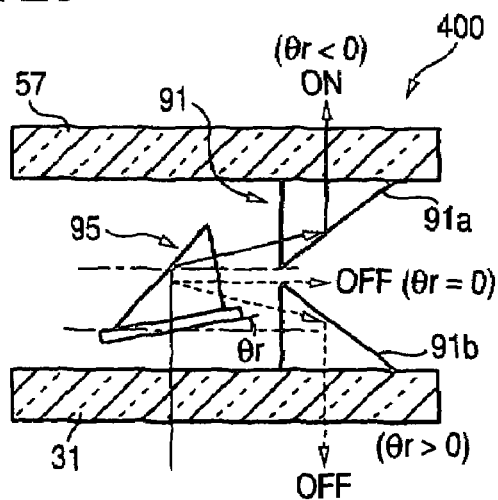
FIG. 26 is a cross-sectional view showing a modification 1 of the fifth embodiment which has an optical path correcting member.

As an application of the transmission type spatial light modulator 400, an optical path correcting member 91a and an optical path correcting member 91b may be provided at the light emission face side of the deflecting portion 95 so as to be spaced from each other through a gap as shown in FIG. 26. That is, an optical system is constructed by the combination of a movable prism and a fixed prism. According to such a construction, ON light can be emitted from the front-surface protection substrate 57 by the optical path correcting member 91a in the case of the inclination angle θr<0°, OFF light can be emitted in the horizontal direction in the case of the inclination angle θr=0°, and OFF light can be emitted from the substrate 31 by the optical path correcting member 91b in the case of the inclination angle θr>0°. That is, since the deflection angle θs can be increased by a small inclination angle θr, the deflected light is selectively introduced into the two optical path correcting member 91 which are spaced from each other, whereby the deflection in the same direction as the incident light L1, in the opposite direction to the incident light L1 and in the vertical direction to the incident light L1 can be surely performed.

Since the deflecting portion 95 has a prism shape, a large deflection angle (θs) can be achieved by a small inclination angle (θr). Furthermore, the reflection loss can be reduced, and the light absorption can be reduced as compared with the reflection at the metal surface. Still furthermore, since the deflection angle is increased, a margin can be easily taken (the design limit is moderated), and the degree of freedom of the optical design of an optical path or the like can be enhanced. Accordingly, for example, an optical communication device such as an optical switch for switching an optical path can be provided at a low price.

As a modification of the transmission type spatial light modulator 400, two total reflection faces 89a and 89b are provided by using a parallelogram deflecting portion 97 as shown in FIG. 27. According to such a construction, ON light is emitted from the front-surface protection substrate 57 by the total reflection faces 89a and 89b in the case of the inclination angle θr<0°, OFF light can be emitted in an oblique upward direction from the total reflection face 89b by the total reflection face 89a in the case of the inclination angle θr=0°, and OFF light is emitted substantially in the horizontal direction from the total reflection face 89b by the total reflection face 89a. Accordingly, the OFF light is not returned to the incident side, and it can be escaped to an area which has less influence on the other areas, so that a stray light treatment can be excellently performed.

Next, a sixth embodiment of the transmission type spatial light modulator according to the present invention will be described. FIGS. 28A to 28C are cross-sectional views showing a sixth embodiment in which the light emission face of the minute transparent optical member has a curved-surface shape. In a transmission type spatial light modulator 500 of this embodiment, at least a part of the light incident face or light emission face of a minute transparent optical member 99 is designed in a curved-surface shape. In this embodiment, the light emission face is designed to have a convex curved-surface shape. That is, a deflecting portion 101 is designed in a convex-lens shape. The shape of the deflecting portion 101 may be designed in a concave-lens shape or it may be a Fresnel zone plate having a curved line portion which is coaxially different in curvature.

According to the transmission type spatial light modulator 500, at least a part of the light incident face or light emission face is designed in a curved-surface shape. Therefore, the refractive index can be continuously varied, and also the refractive index difference in a refractive index variable range can be increased (as a result, the deflection angle difference can be increased).

Figure 30A:
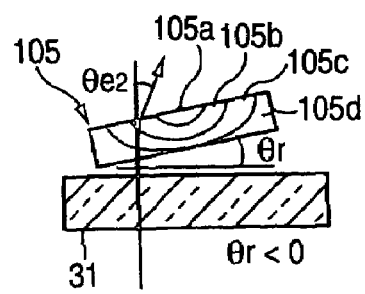
FIGS. 30A to 30C are cross-sectional views showing a modification of the seventh embodiment in which the refractive interface is designed in a curved-surface shape.
Figure 30B:
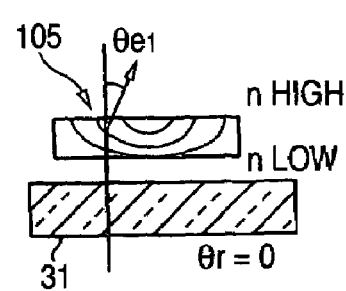
Figure 30C:
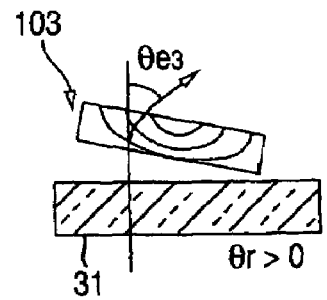

Next, a seventh embodiment of the transmission type spatial light modulator according to the present invention will be described. FIGS. 29A to 29C are cross-sectional views showing a seventh embodiment in which the minute transparent optical member has a refractive index distribution, and FIGS. 30A to 30C are cross-sectional views showing a modification of the seventh embodiment in which a refraction interface is designed to be a curved surface.

In a transmission type spatial light modulator 600 of this embodiment, a minute transparent optical member 103 has a refractive index distribution which is different in refractive index in the travel direction of light. In addition, the light deflecting direction based on the refractive index distribution is not parallel to the light travel direction, and thus both the directions are different from each other. The minute transparent optical member 103 having such a characteristic can be constructed by designing the whole of the minute transparent optical member 103 or only the deflecting portion in a rectangular sectional shape as shown in FIGS. 29A to 29C, and making the refractive index n1 of an upper medium 103a and the refractive index n2 of a lower medium 103b different from each other (for example, n1>n2) with a pair of diagonal lines as the boundary therebetween.

In the transmission type spatial light modulator 600, as shown in FIG. 29B, under the initial condition that the driving member 35 is not actuated, the emission angle of the deflected light is θe1 for the inclination angle θr=0°. As shown in FIG. 29A, the driving member 35 is actuated, and the emission angle of the deflected light is θe2 for the inclination angle θr<0°. Furthermore, as shown in FIG. 29C, the driving member 35 is actuated, and the emission angle of the deflected light is θe3 for the inclination angle θr>0°. Here, by setting the refractive indexes n1, n2 and the attachment face angle of the media 103a, 103b, "θe1≠θe2<θe3" can be established. That is, any deflection range can be set by setting a refractive index distribution or the like.

According to a transmission type spatial light modulator 600, a minute transparent optical member 103 has a refractive index distribution in which the refractive index is varied in the light travel direction, and also the light deflection direction achieved by the refractive index distribution is not parallel to the light travel direction, so that any deflection range can be set by using a flat-plate type minute transparent optical member 103. Furthermore, the thickness of the minute transparent optical member 103 having a desired deflection range can be reduced, so that the modulator can be designed to be light in weight and have high-speed response.

As a modification of the transmission type spatial light modulator 600, as shown in FIGS. 30A to 30C, a minute transparent optical member 105 is achieved by laminating two or more media (105a, 105b, 105c, 105d). In this case, the respective media are laminated so that the interfaces thereof are arranged in a coaxial arcuate shape, and they are designed so that a medium located at a near position to the center has a higher refractive index. This construction has an effect of further increasing the angle difference between (θe1≠θe2) and (θe3) as compared with the construction shown in FIGS. 29A to 29C.

Figure 31:
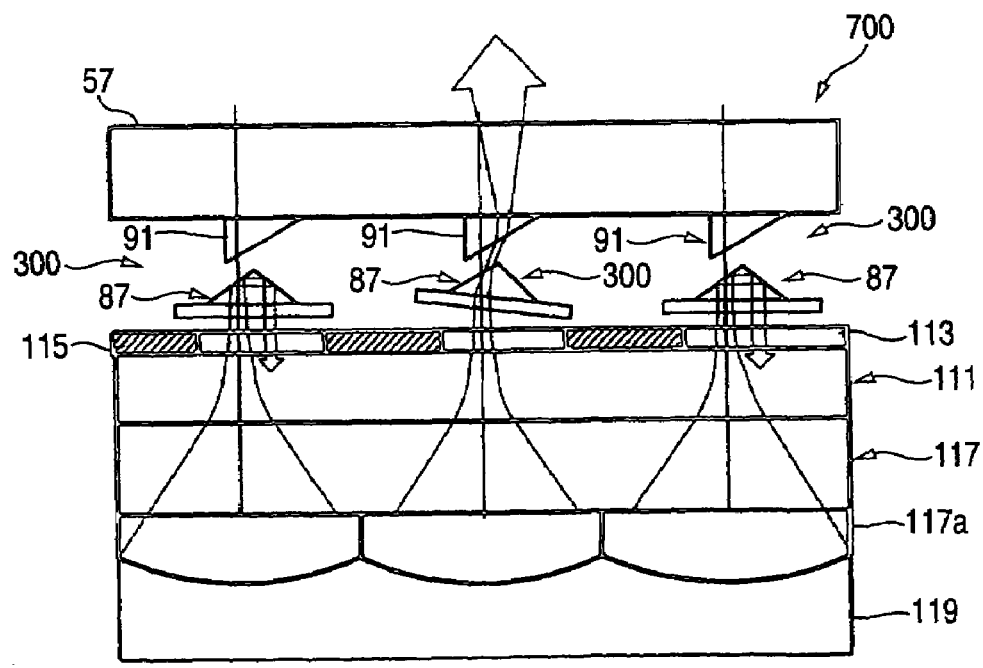
FIG. 31 is a cross-sectional view of the transmission type spatial light modulation array device according to an eighth embodiment which aims at integration of micro-lenses.
Figure 32:
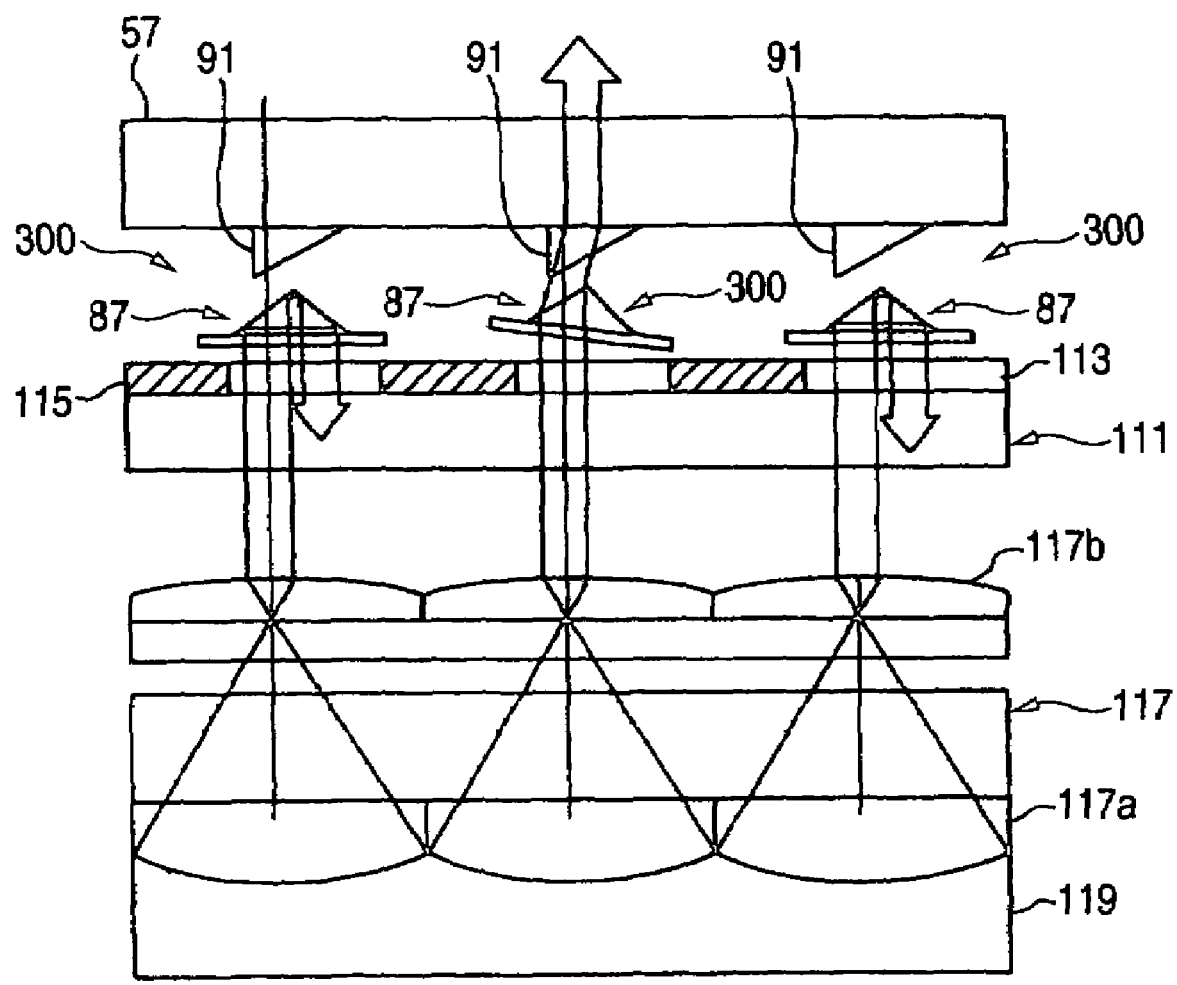
FIG. 32 is a cross-sectional view showing a modification of the transmission type spatial light modulation array device shown in FIG. 31 which is equipped with two-stage micro-lenses.

Next, an eighth embodiment of the transmission type spatial light modulation array device according to the present invention will be described. FIG. 31 is a cross-sectional view showing the transmission type spatial light modulation array device according to the eighth embodiment in which micro-lenses are integrated, and FIG. 32 is a cross-sectional view showing a modification of the transmission type spatial light modulation array device shown in FIG. 31 which is equipped with two-stage micro-lenses.

The above transmission type spatial light modulators (100, 180, 181, 182, 200, 300, 400, 500 or 600) may be arranged one-dimensionally or two-dimensionally to constitute a transmission type spatial light modulation array device 700. For example, the transmission type spatial light modulators 300 having the same structure are arranged one-dimensionally or two-dimensionally on the same movable element substrate 111, whereby the transmission type spatial light modulation array device 700 functions as one transmission type light deflecting device.

A transparent insulating film 113 is laminated on a movable element device 111, and the above driving circuits (CMOS or the like) 115 are respectively formed in the other area than the light transmission area of the transparent insulating film 113 in connection with the respective transmission type spatial light modulators 300. Furthermore, a micro-lens array 117 is disposed and joined to the light incident face of the movable element substrate 111 so as to confront the light incident face of the movable element substrate 111 in parallel. The micro-lens array 117 has plural micro-lenses 117*a* corresponding to the respective transmission type spatial light modulators 300.

According to the transmission type spatial light modulation array device 700, the transmission type spatial light modulators described above (100, 180, 181, 182, 200, 300, 400, 500 or 600) are one-dimensionally or two-dimensionally arranged and thus they function as one light modulation device. Therefore, they can optically modulate high-density pixels at high speed in an application to a light exposure head, a display or the like. In addition, many transmission type spatial light modulators can be arranged with the same quality and high precision by the semiconductor manufacturing process, so that image display, etc. can be performed with high quality and high precision while aligning emission light.

The micro-lens array 117 having the plural micro-lenses 117*a* corresponding to the respective transmission type spatial light modulators are arranged at the light incident face so as to confront the light incident face, and thus the incident light flux can be narrowed down, so that the minute transparent optical member is miniaturized and reduced in weight, and the high-speed driving, the low-voltage driving and the low power-consumption driving can be performed. Furthermore, as compared with a case where no micro-lens 117*a* is used, the minute transparent optical member can be formed in a small area, and thus the driving circuit area can be more easily secured when compared on the assumption of the same substrate area.

As a modification of the transmission type spatial light modulation array device 700, other micro-lenses 117*b* are formed on the same optical axis as the micro-lenses 117*a* as shown in FIG. 32. In this construction, the incident light flux is passed through the micro-lenses 117*a*, whereby the light converged to the focusing point is passed through the other micro-lenses 117*b* as divergent light and collimated light is made incident to the movable element substrate 111.

Figure 33:
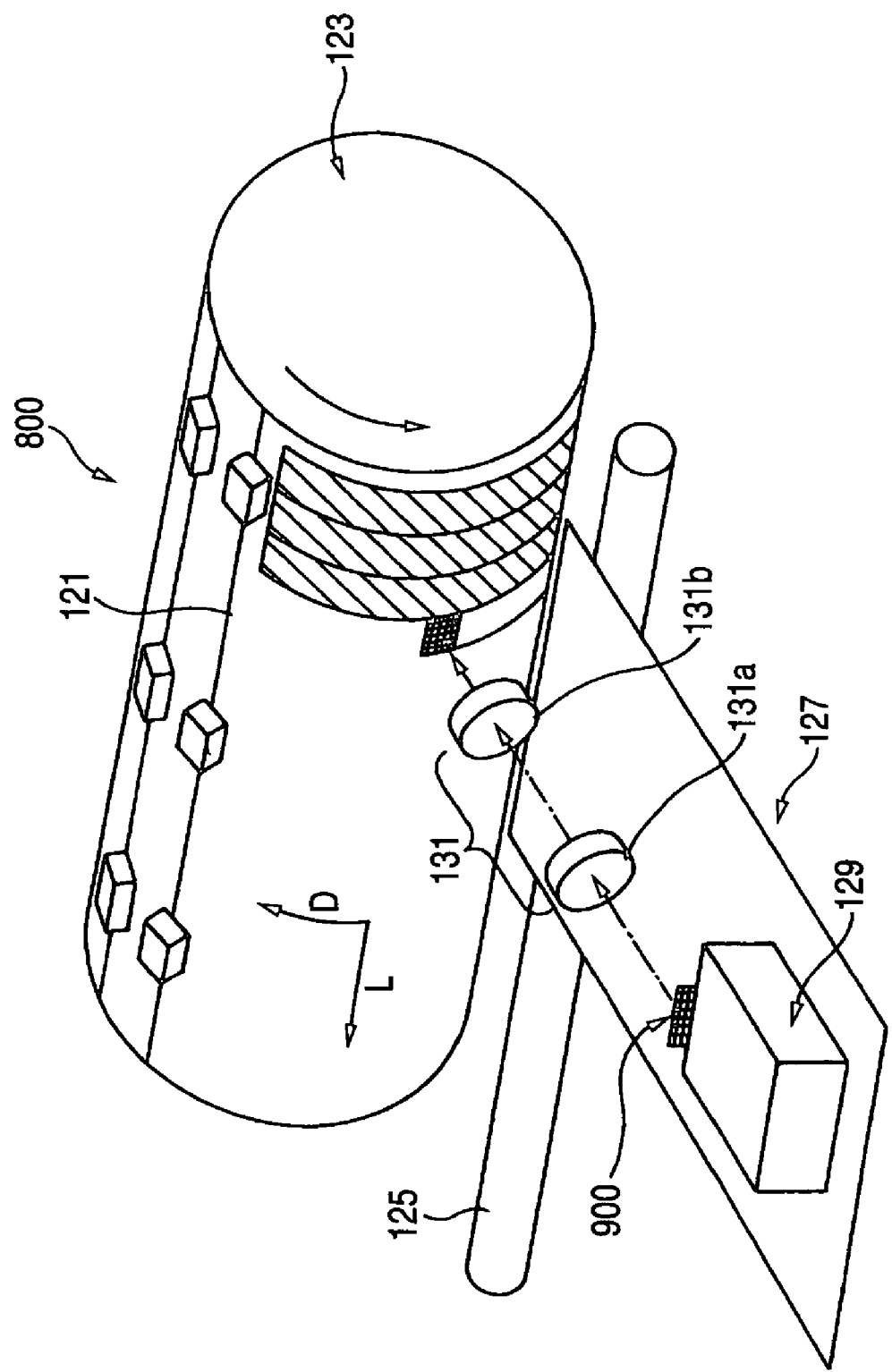
FIG. 33 is a diagram showing the construction of an exposure device according to a ninth embodiment using the transmission type spatial light modulation array device.

Next, a ninth embodiment adopting the transmission type spatial light modulation array device of this invention as an exposure device will be described. FIG. 33 is a diagram showing the construction of the exposure device of the ninth embodiment which uses the transmission type spatial light modulation array device, FIG. 34 is a block diagram showing the exposure device shown in FIG. 33 and FIG. 35 is a diagram showing the optical path of the exposure device shown in FIG. 33.

The transmission type spatial light modulation array device described above is suitably applicable to the exposure device 800 shown in FIG. 33, for example. The transmission type spatial light modulation array device 900 may be constructed by providing the micro-lens array 117 to the transmission type spatial light modulators 100. The exposure device 800 is equipped with a drum 123 for holding an exposure target 121 while adsorbing the exposure target 121 on the outer peripheral surface thereof, and an auxiliary scanning unit 127 which is freely movably supported by a guide shaft 125 extending along the rotational axis of the exposure device 3. The drum 123 is counterclockwise rotated by a rotational driving motor (not shown). The auxiliary scanning unit 127 is moved in the right-and-left direction of FIG. 33 by a horizontal driving motor (not shown). Here, with respect to the exposure target 121, a D-direction based on the rotation of the drum 123 corresponds to a main scanning direction, and an L-direction based on the movement of the auxiliary scanning unit 127 corresponds to an auxiliary scanning direction.

Figure 34:
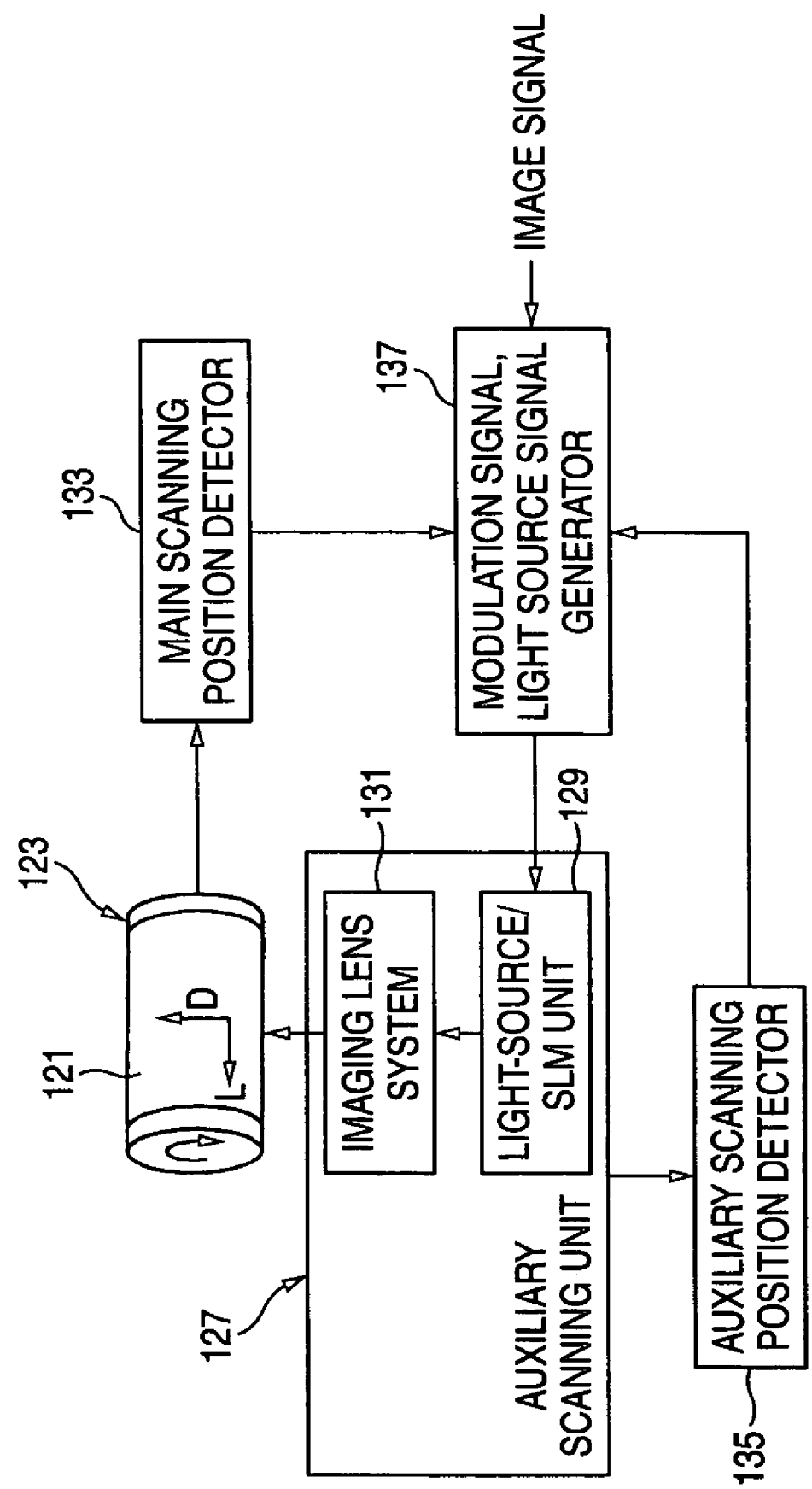
FIG. 34 is a block diagram showing the exposure device shown in FIG. 33.
Figure 35:
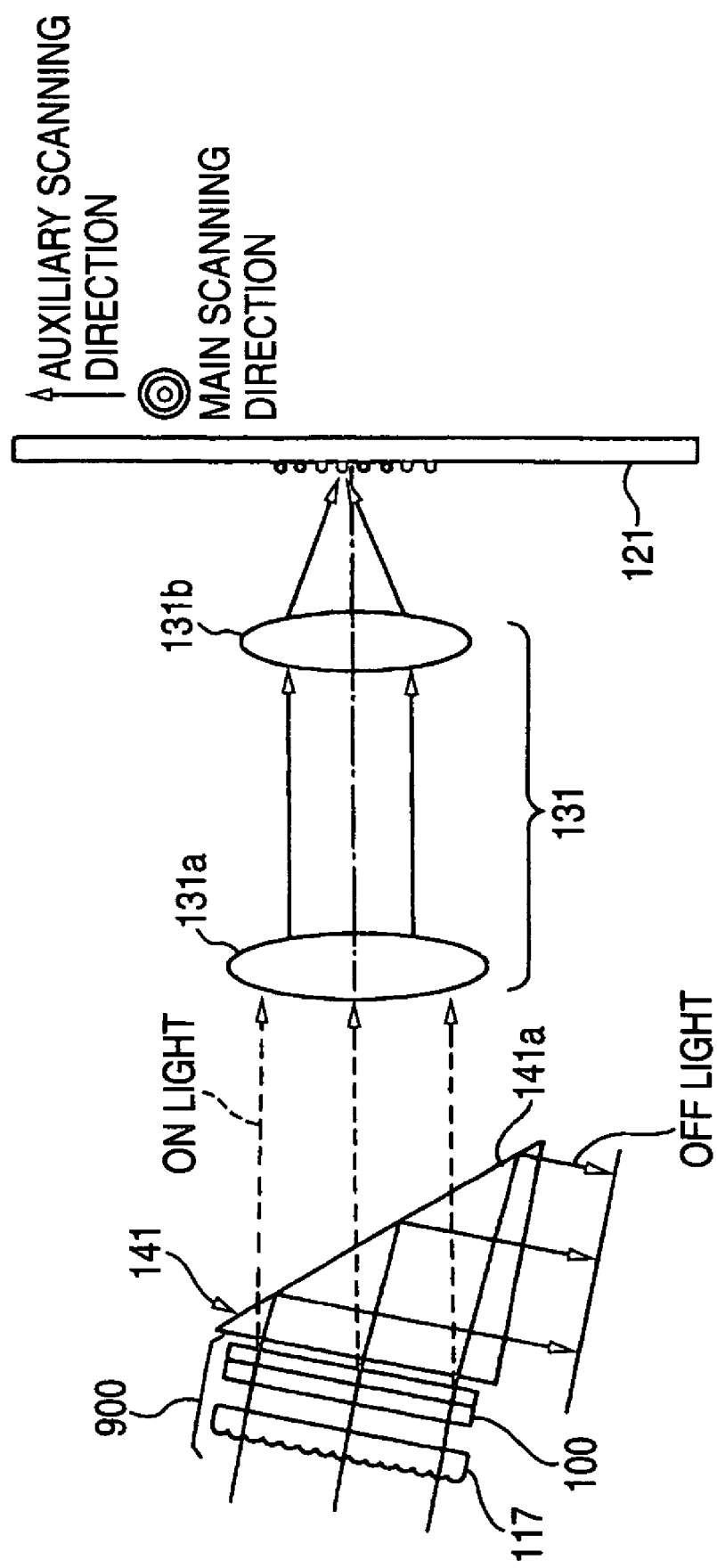
FIG. 35 is a diagram showing the optical path of the exposure device shown in FIG. 33.
Figure 36:
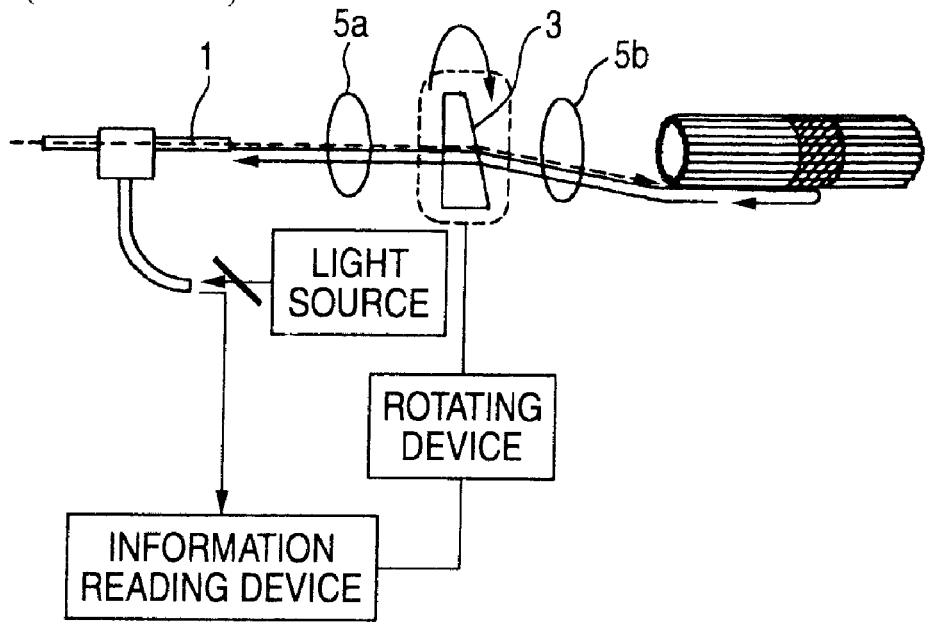
FIG. 36 is a schematic diagram showing an optical switch serving as a conventional transmission type mechanical light deflector.
Figure 37A:
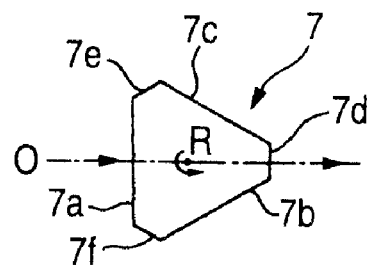
FIG. 37 is a diagram showing the construction of a main part of a beam deflecting device serving as a conventional transmission type mechanical light deflector.
Figure 37B:
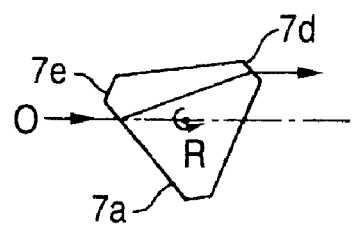
Figure 37C:
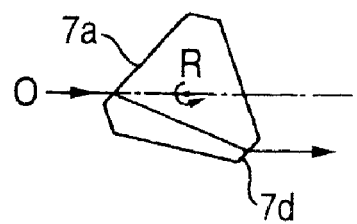
Figure 38A:
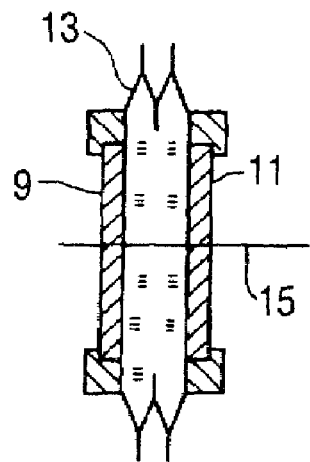
FIG. 38 is a diagram showing the construction of a main part of an apex-angle variable prism device serving as a conventional transmission type mechanical light deflector.
Figure 38B:
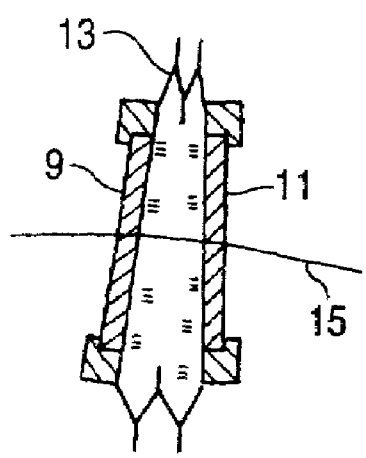
Figure 39:
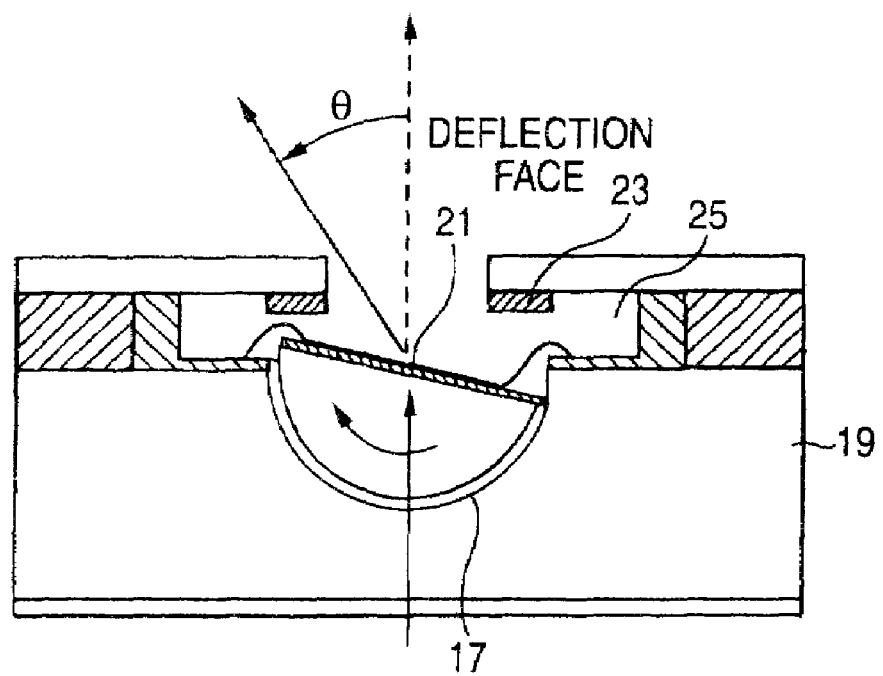
FIG. 39 is a diagram showing the construction of a main part of a light deflecting device serving as a conventional transmission type mechanical light deflector.

As shown in FIG. 34, the auxiliary scanning unit 127 has a light-source/SLM (optical modulating) unit 129 and an imaging lens system 131. The rotational position of the drum 123 is detected by a main scanning position detector 133, and the moving position of the auxiliary scanning unit 127 is detected by an auxiliary scanning position detector 135. The position signals detected by the main scanning position detector 133 and the auxiliary scanning position detector 135 are input to a signal generator 137. The signal generator 137 outputs a modulation signal and a light source signal to the light-source/SLM unit 129 in accordance with an image signal transmitted from a superordinate controller on the basis of these position signals. The imaging lens system 131 is constructed by combined zoom lenses 131*a*, 1341*b* for imaging a laser beam modulated and emitted from the light-source/SLM unit 129 onto the surface of the exposure target 121 while varying the magnification thereof.

In the light-source/SLM unit 129, plural transmission type spatial light modulators 100 are arranged in the auxiliary scanning direction in the transmission type spatial light modulation array device 900. An optical path correcting member 141 is disposed at the light incident face side of the transmission type spatial light modulation array device 900, and the optical path correcting member 141 totally reflects or transmits deflected light emitted from the transmission type modulation array device 900 by the emission face 141*a*, thereby separating the light into effective light (ON light) and unnecessary light (OFF light).

Accordingly, when the exposure target 121 and the auxiliary scanning unit 127 are relatively moved in the direction (main scanning direction) perpendicular to the arrangement direction of the transmission type spatial light modulators 100, one-line pixels whose number is equal to the arrangement number of the transmission type spatial light modulators 100 can be exposed to ON light emitted form the emission face 141*a* in the same direction as described above. Image signals of one line are transmitted as modulation signals and light source signals to the transmission type spatial light modulators 100 together with the movement of the exposure target 121 in the main scanning direction, and the respective transmission type spatial light modulators 100 are controlled to be turned on and off. Accordingly, the exposure light emitted from the auxiliary scanning unit 127 is turned on and off, and exposure control is carried out on the exposure target 121 every pixels whose number is equal to the number of the transmission type spatial light modulators 100 in the main scanning direction, thereby carrying out the scan-exposure operation of one line. Thereafter, the auxiliary scanning unit 127 is moved in the auxiliary scanning direction, and the subsequent one line is successively exposed to light in the same manner.

As described above, according to the exposure device 800 having the transmission type spatial light modulation array device 900, the incident light L1 is deflected at high speed by the transmission type spatial light modulation array device 900, and the deflected light is separated into ON light and OFF light by the optical path correcting member 141, whereby exposure or image recording can be carried out on the exposure target 121. Furthermore, the deflected light can be emitted substantially in the straight direction by using the transmission type spatial light modulators 100, and it is not required to bend the optical path at a large angle, which is needed in the case of the reflection type spatial light modulator. Therefore, the optical system around the modulator can be disposed linearly and thus the compact design of the device can be facilitated.

The exposure target 121 may be not only a recording medium held bon the drum 123, but also a screen. In this case, the driving of the transmission type spatial light modulation array device 900 is controlled in accordance with an image signal, and emission light is projected onto the screen through a projection lens. Accordingly, a projector using the transmission type spatial light modulators can be achieved.

According to the transmission type spatial light modulator and the transmission type spatial light modulation array device, the direction and light amount of the transmitted light can be controlled by a small displacement amount, and high-speed deflection and low-voltage driving can be performed. Therefore, they are applicable to high-precision and high-resolution exposure head, display, etc.

What is claimed is:

1. A transmission type spatial light modulator comprising:
   an optical member that deflects and emits light in a direction different from an incident direction of incident light;
   a support member that supports the optical member in a midair position so that a light emission face thereof can be inclined with respect to a plane perpendicular to a travel direction of the light incident direction; and
   driving member that obliquely displaces the optical member to vary the light emission direction from the optical member.

2. The transmission type spatial light modulator according to claim 1, wherein the optical member is a minute transparent optical member.

3. The transmission type spatial light modulator according to claim 1, wherein the driving member controls the driving member by an electrical mechanical operation.

4. The transmission type spatial light modulator according to claim 1, which further comprises a light shielding member that is disposed ahead of the light emission face of the optical member and shields any emission light in a direction-variable range of light emitted from the optical member.

5. The transmission type spatial light modulator according to claim 4, wherein the driving member obliquely displaces the optical member to displace the emission light with respect to the light shielding member, thereby varying an amount of transmission light of the emission light.

6. The transmission type spatial light modulator according to claim 1, wherein the optical member has a refractive index larger than 1, and a light incident surface and a light emission surface have non-parallel faces to each other.

7. The transmission type spatial light modulator according to claim 1, wherein the optical member has a refractive index distribution different in refractive index in accordance with the light travel direction, and a light deflection direction based on the refractive index distribution is different from the light travel direction.

8. The transmission type spatial light modulator according to claim 1, wherein the optical member has a total reflection face that totally reflects the incident light.

9. The transmission type spatial light modulator according to claim 8, wherein the optical member is obliquely displaced by the driving member to transmit or totally reflect the incident light.

10. The transmission type spatial light modulator according to claim 9, which further comprises an optical path correcting member that is disposed ahead of the light emission face of the optical member to make an incident angle and an emission angle substantially coincident with each other.

11. The transmission type spatial light modulator according to claim 8, wherein the optical member has a prism-shape.

12. The transmission type spatial light modulator according to claim 8, wherein at least a part of the light incident face or light emission face of the optical member has a curved-surface shape.

13. The transmission type spatial light modulator according to claim 1, which further comprises:
    a first prism member that receives a emission light when the optical member is obliquely displaced by the driving member and the emission light is emitted from the optical member in a predetermined direction, and emits the emission light as effective light while deflecting the emission light in a first direction; and
    a second prism member that receives a emission light when the optical member is obliquely displaced by the driving member and the emission light is emitted from the optical member in a direction different from the predetermined direction, and deflects the emission light as unnecessary light in a second direction different from the first direction.

14. The transmission type spatial light modulator according to claim 1, wherein the driving member obliquely displaces the optical member by electrostatic force.

15. A transmission type spatial light modulation array device comprising transmission type spatial light modulators according to claim 1, wherein the transmission type spatial light modulators are arranged one-dimensionally or two-dimensionally.

16. The transmission type spatial light modulation array device according to claim 15, wherein a micro-lens array having a plurality of micro-lenses disposed in connection with the respective transmission type spatial light modulators is disposed so as to confront the light incident face.

17. The transmission type spatial light modulator according to claim 1, wherein the light emission direction is in the travel direction of the light incident direction.

18. The transmission type spatial light modulator according to claim 1, wherein the optical member is a transmission type light deflector, wherein the incident light and emission light exist at different sides with respect to the optical member.

19. The transmission type spatial light modulator according to claim 1, wherein the driving member rotates the optical member in the midair position about an axis orthogonal to the travel direction of the incident light.

20. The transmission type spatial light modulator according to claim 1, wherein the optical member is transparent to the incident light.

21. The transmission type spatial light modulator according to claim 1, further including an air gap below a light incident face, wherein the incident light passes through the air gap.

22. The transmission type spatial light modulator according to claim 4, wherein the light shielding member only shields emission light having an emission angle within a predetermined range.

23. The transmission type spatial light modulator according to claim 4, wherein the light shielding member shields emission light by absorption.

24. The transmission type spatial light modulator according to claim 7, wherein the refractive index distribution includes a plurality of refractive indices, distributed within the optical member in accordance with the light travel direction.

25. The transmission type spatial light modulator according to claim 7, wherein the refractive index is continuously varied within the optical member.

26. The transmission type spatial light modulator according to claim 8, wherein the total reflection face is an inner face of a light emission surface.

27. The transmission type spatial light modulator according to claim 8, wherein the incident light is totally reflected at an inner face of the optical member.

28. The transmission type spatial light modulator according to claim 9, wherein the optical member is obliquely displaced to switch between a transmission state and a total reflection state of the incident light.

29. The transmission type spatial light modulator according to claim 28, wherein during the transmission state, deflected light is emitted from an opposite side to the light incident face of the optical member, and during the total reflection state, reflected light is emitted from a light incident face side of the optical member.

30. The transmission type spatial light modulator according to claim 10, wherein an emitted light of the correcting member and the incident light are substantially parallel to each other.

* * * * *